United States Patent [19]
Thomeer et al.

[11] Patent Number: 6,065,540
[45] Date of Patent: May 23, 2000

[54] COMPOSITE COILED TUBING APPARATUS AND METHODS

[75] Inventors: Bart Thomeer, Houston, Tex.; Robert Sorem, Lawrence, Kans.

[73] Assignee: Schlumberger Technology Corporation, Sugar Land, Tex.

[21] Appl. No.: 09/246,684

[22] Filed: Feb. 8, 1999

Related U.S. Application Data

[60] Continuation of application No. 09/013,417, Jan. 26, 1998, Pat. No. 5,933,945, which is a division of application No. 08/593,634, Jan. 29, 1996, Pat. No. 5,828,003.

[51] Int. Cl.⁷ .................................................. E21B 29/00
[52] U.S. Cl. ..................... 166/297; 166/77.2; 166/242.2; 166/242.6; 166/300; 166/380; 166/384; 29/33 D; 138/125; 138/137
[58] Field of Search ........................ 166/73, 77.2, 242.1, 166/242.2, 242.6, 297, 300, 376, 380, 384; 29/33 D; 138/123, 125, 137

[56] References Cited

U.S. PATENT DOCUMENTS

| | | |
|---|---|---|
| 3,949,673 | 4/1976 | Lyerly . |
| 3,955,878 | 5/1976 | Nowak . |
| 4,146,302 | 3/1979 | Jachimowicz . |
| 4,336,415 | 6/1982 | Walling . |
| 4,374,530 | 2/1983 | Walling . |
| 4,446,892 | 5/1984 | Maxwell . |
| 4,465,105 | 8/1984 | Slater . |
| 4,468,088 | 8/1984 | van der Hoek . |
| 4,554,650 | 11/1985 | Brown et al. . |
| 4,570,705 | 2/1986 | Walling . |
| 4,940,095 | 7/1990 | Newman . |
| 5,025,861 | 6/1991 | Huber . |
| 5,048,441 | 9/1991 | Quigley . |
| 5,097,870 | 3/1992 | Williams . |
| 5,172,765 | 12/1992 | Sas-Jaworsky et al. ............... 166/384 |
| 5,176,180 | 1/1993 | Williiams et al. ..................... 138/172 |
| 5,285,008 | 2/1994 | Sas-Jaworsky et al. . |
| 5,285,204 | 2/1994 | Sas-Jaworsky et al. . |
| 5,348,096 | 9/1994 | Williams ................................ 166/384 |
| 5,469,916 | 11/1995 | Sas-Jaworsky et al. . |
| 5,494,105 | 2/1996 | Morris . |
| 5,507,346 | 4/1996 | Gano et al. ............................. 166/285 |

OTHER PUBLICATIONS

A. Sas–Jaworsky & J.G. Williams, "Development of Composite Coiled Tubing For Oilfield Services", Oct., 1993, Society of Petroleum Engineers Annual conference, Houston, Texas, SPE 26536.

A. Sas–Jaworsky & J. G. Williams, "Enabling Capabilities and Potential Applications of Composite Coiled Tubing", Mar. 29–31, 1994, 2$^{nd}$ Annual World Oil Coiled Tubing Conference & Exhibition, Houston, Texas.

D. Bigio, A. Rike, A. Christensen, J. Collins, D. Hardman, D. Doremus, P. Tracy, G. Glass, N.B. Joergensen, D. Stephens, "Coiled Tubing Takes Center Stage", Oct., 1994, Oilfield Review, pp. 9–23.

"Horizontal Drilling", Sep., 1995, The American Oil & Gas Reporter, p. 45, vol. 38 No. 9.

S. S. Wang & D. W. Fitting, "Composite Materials for Offshore Operations: Proceedings of the First International Workshop", Houston, Texas, Oct., 1993, NIST Special Publication 887.

*Primary Examiner*—Roger Schoeppel
*Attorney, Agent, or Firm*—Douglas Y'Barbo; Gordon Waggett; Robin Nava

[57] ABSTRACT

Products and methods relating to composite materials and their use in coiled tubing is disclosed. The composite tubing is a pressurized means of conveying fluids downhole in a wellbore. It includes a multilayered laminate that resists buckling within the wellbore and is fabricated into a hollow tube. The fibers are oriented in angular relationship to the longitudinal direction of the coiled tubing such as to provide appropriate strength and buckling characteristics to the coiled tubing. Further, the coiled tubing layered laminate may transmit signals representing data from downhole to the surface. In some embodiments, a composite disconnecting device which includes a blend of fibers of different types or orientations is shown. The disconnecting device shows a failure load range corresponding to the failure characteristics of the fiber blend, the fiber blend having a predetermined failure limit.

22 Claims, 23 Drawing Sheets

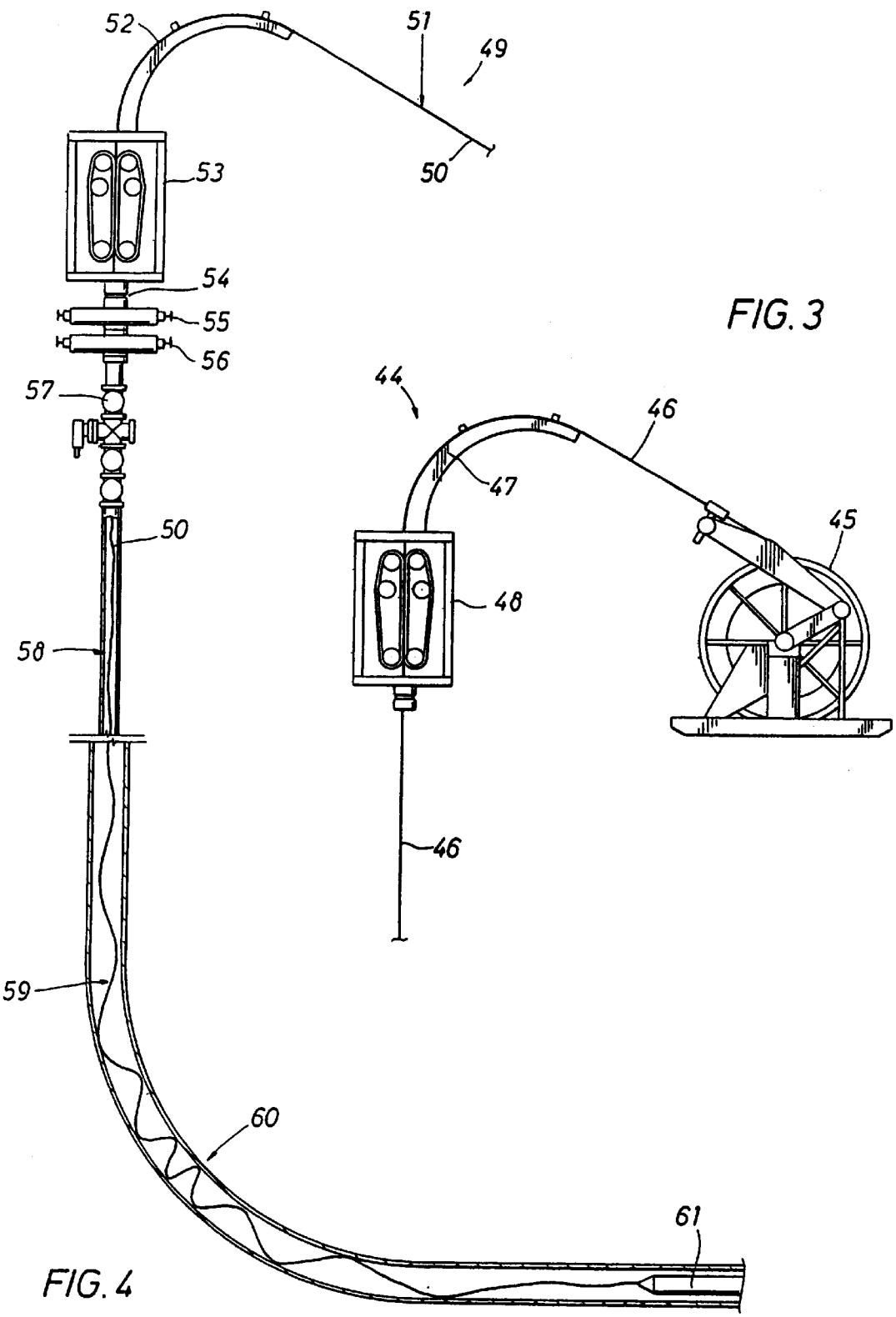

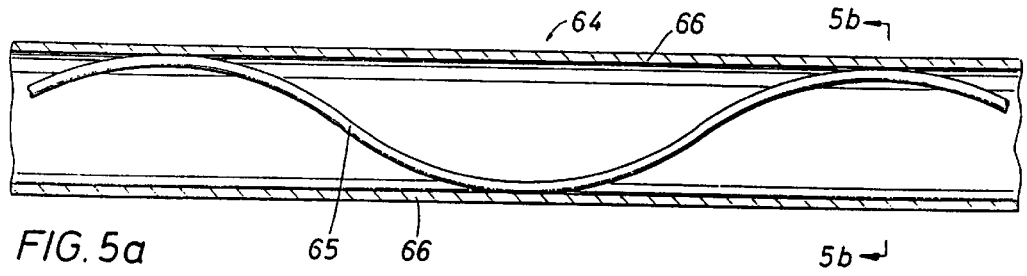
*FIG.5a*
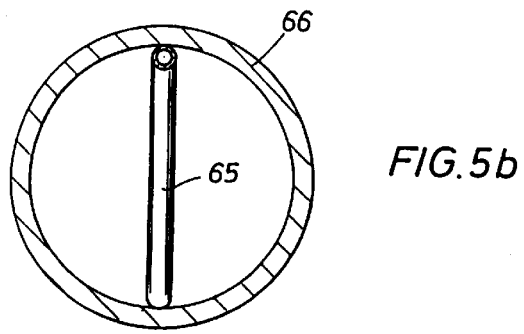
*FIG.5b*
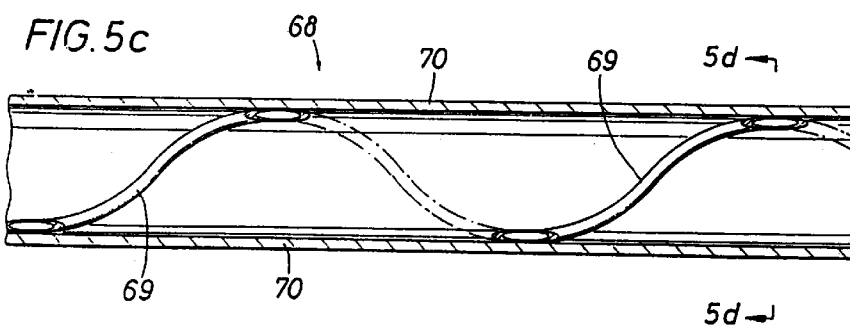
*FIG.5c*
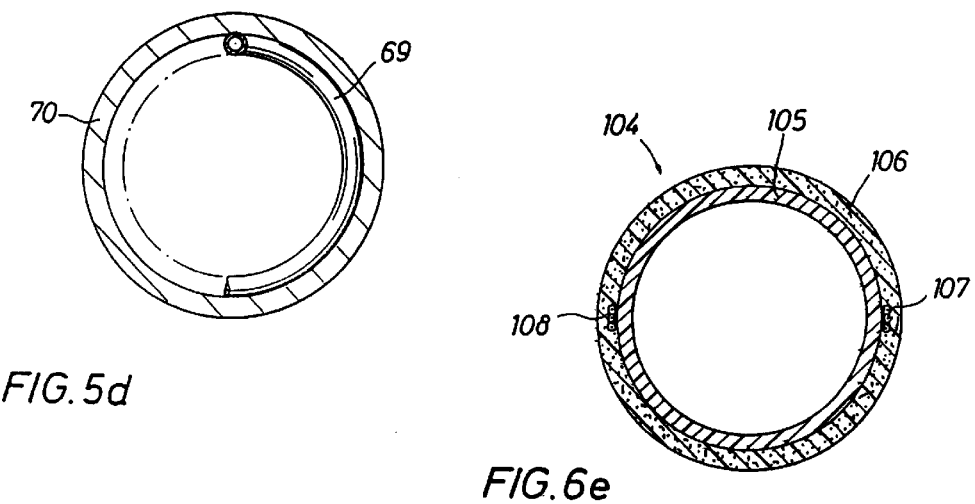
*FIG.5d*
*FIG.6e*

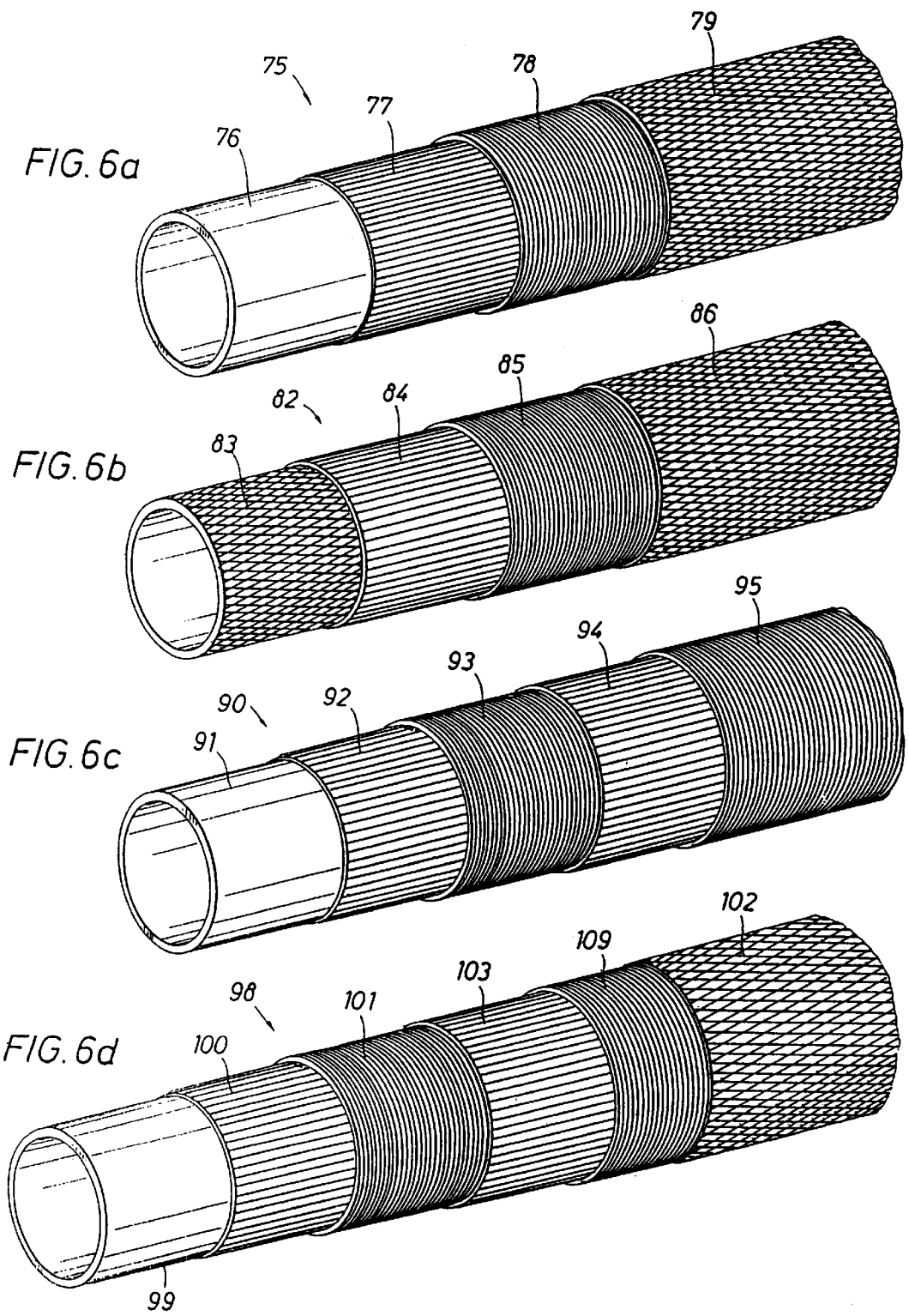

ANSYS 5.0 A-31
FEB 27 1995
12:23:12
PLOT NO. 1
ELEMENTS
TYPE NUM

XV = 1
YV = 1
ZV = 1
DIST = 1.356
ZF = -.5
CENTROID HIDDEN

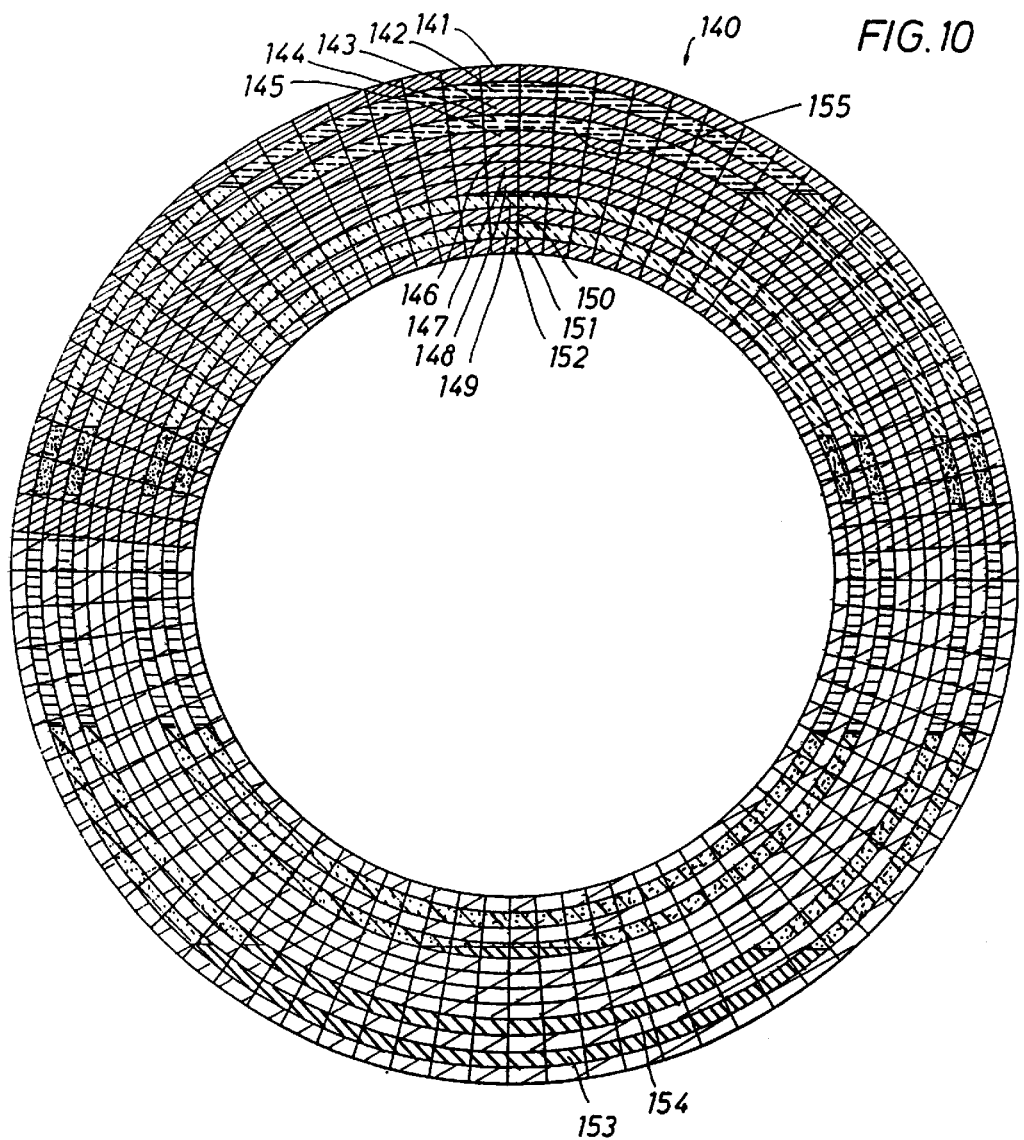
FIG. 10
```
ANSYS 5.0 A-31
FEB 24 1995
14:17:26
PLOT NO. 1
ELEMENT SOLUTION
STEP = 1
SUB = 1
TIME = 1
SZ  (NOAVG)
RSYS = 1
DMX = .687E-03
SMN = -162565
SMX = 156459
```
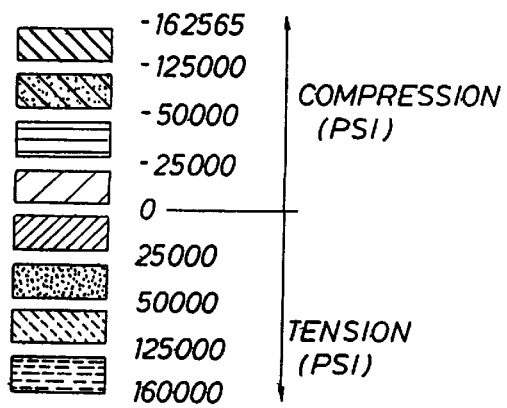

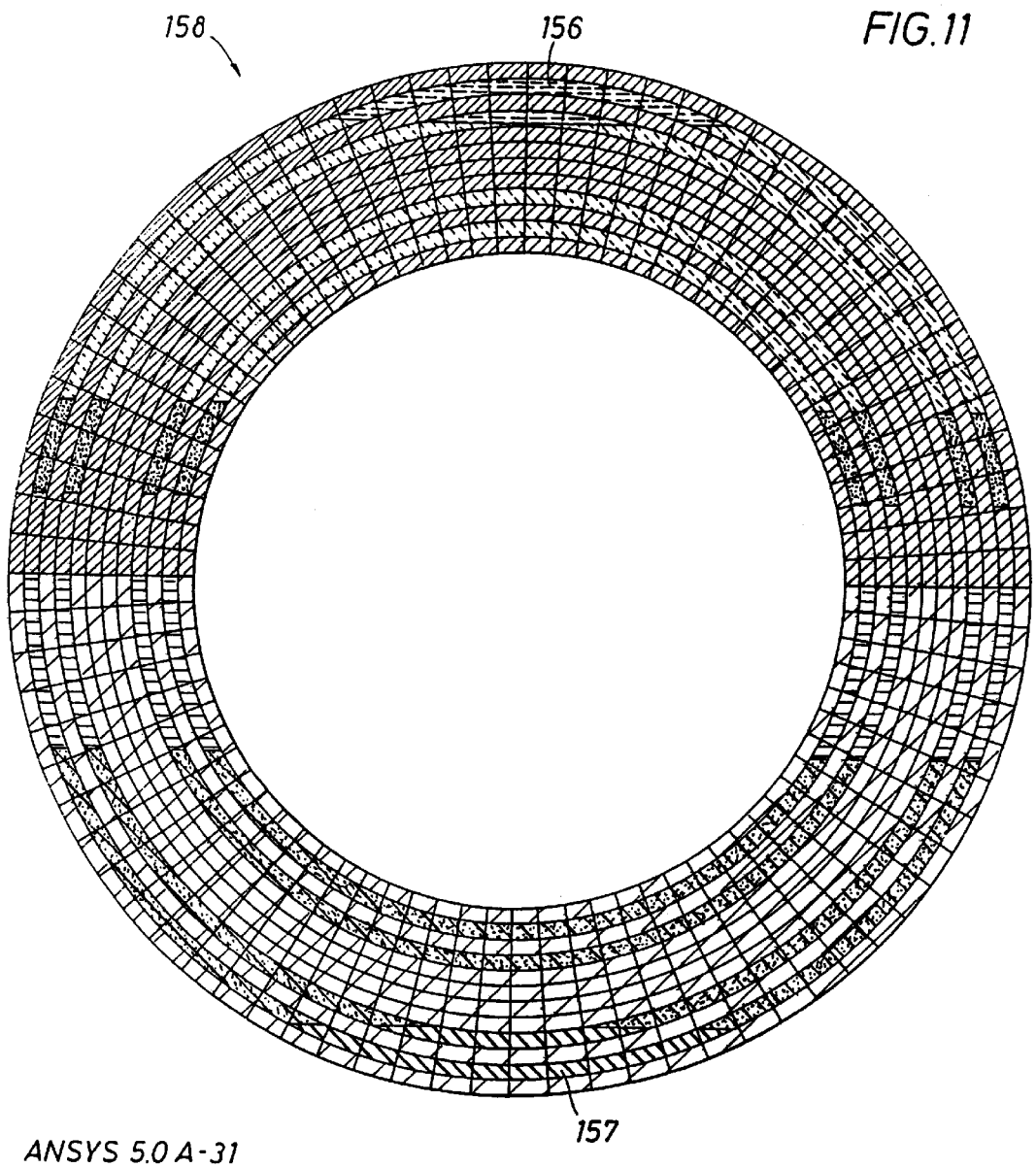
FIG. 11
```
ANSYS 5.0 A-31
FEB 24 1995
14:44:40
PLOT NO. 1
ELEMENT SOLUTION
STEP = 1
SUB = 1
TIME = 1
SZ (NOAVG)
RSYS = 1
DMX = .601E-03
SMN = -142215
SMX = 137520
```
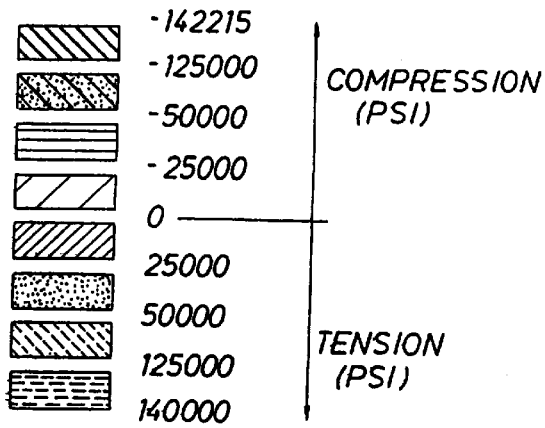

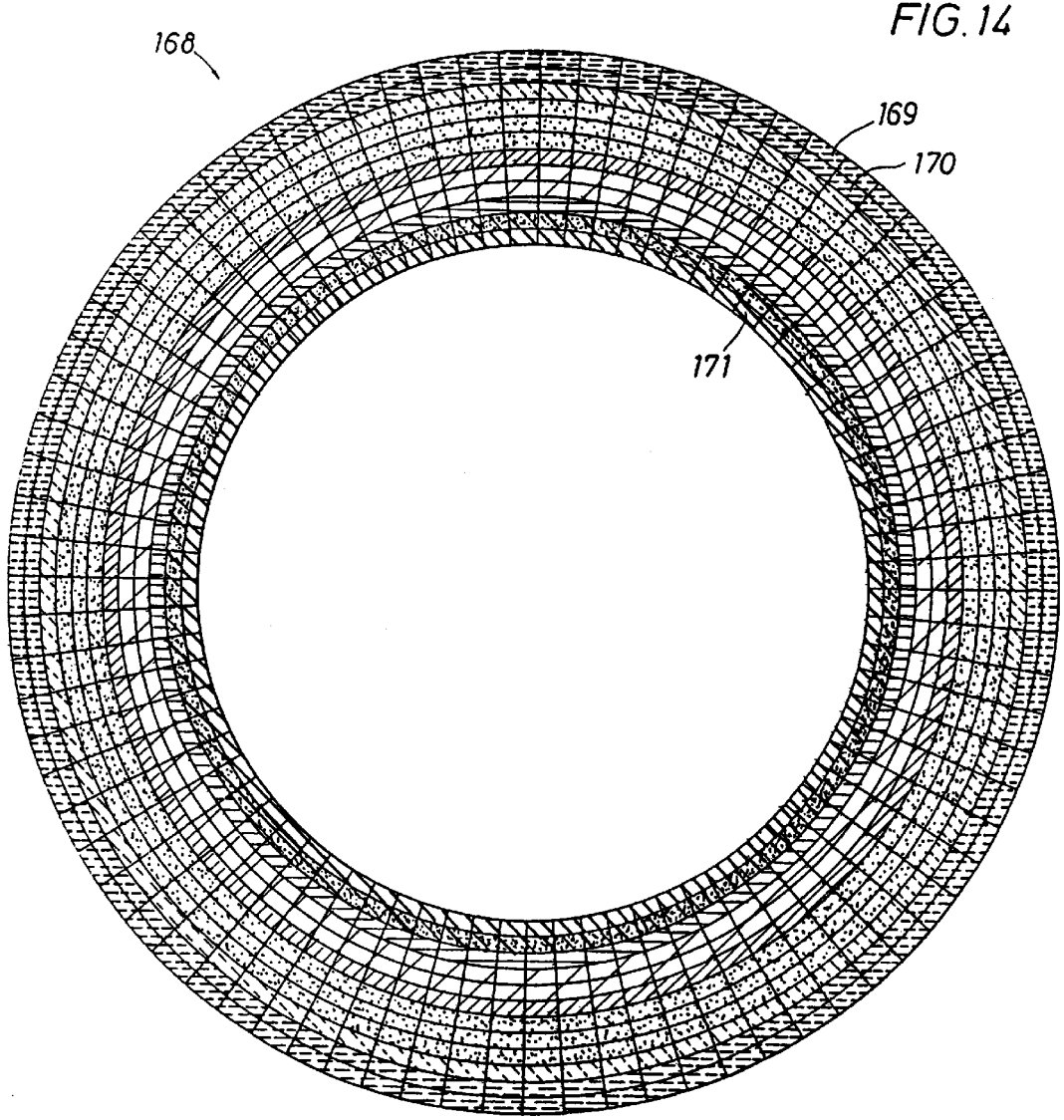
FIG. 14
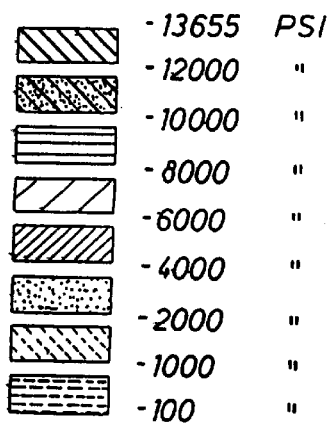
ANSYS 5.0 A-31
FEB 24 1995
14:55:17
PLOT NO. 1
ELEMENT SOLUTION
STEP = 1
SUB = 1
TIME = 1
SX (NOAVG)
RSYS = 1
DMX = .005809
SMN = -13655
SMX = -132.647

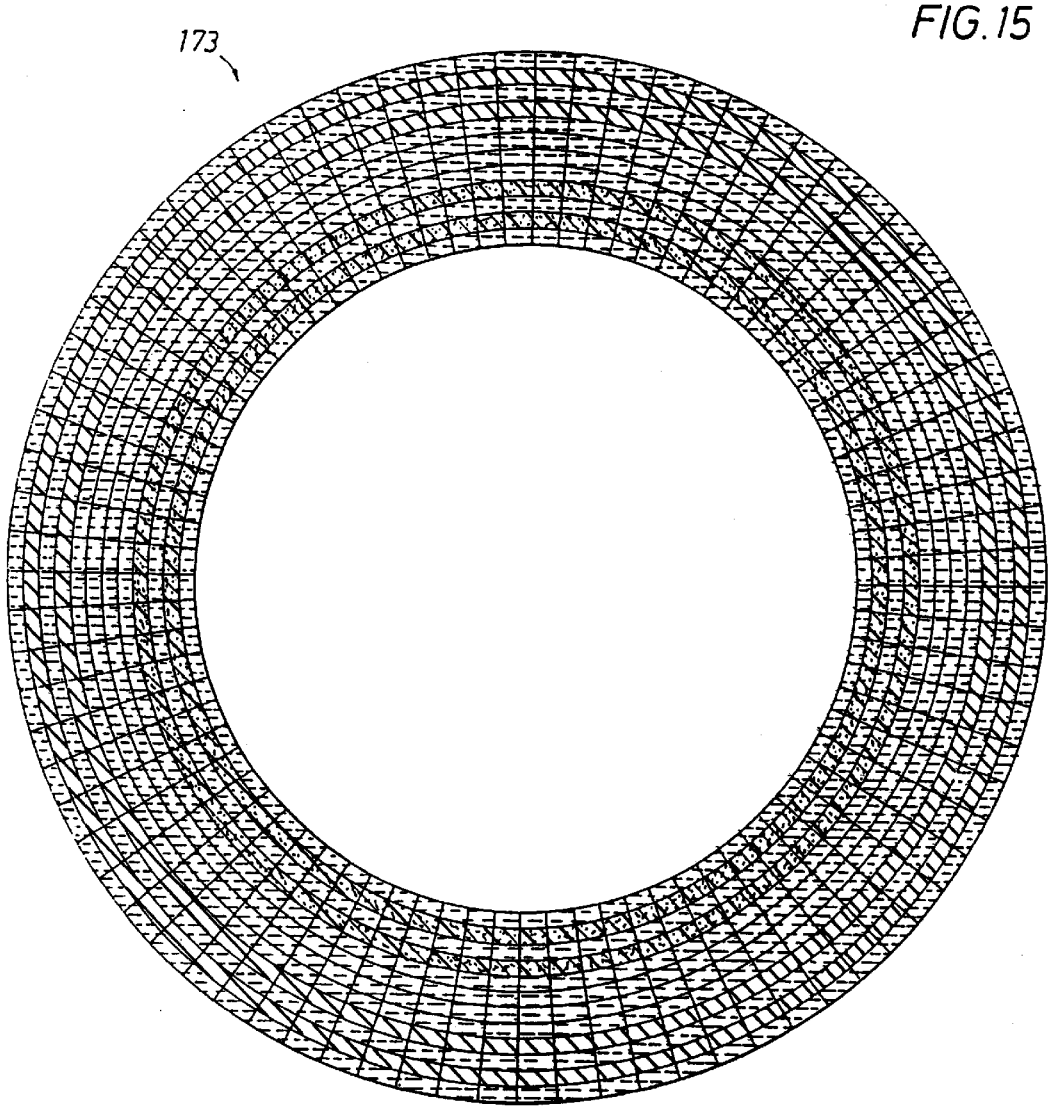
FIG. 15
```
ANSYS 5.0 A-31
FEB 24 1995
15:57:26
PLOT NO. 1
ELEMENT SOLUTION
STEP = 1
SUB = 1
TIME = 7500
SZ (NOAVG)
RSYS = 1
DMX = .003105
SMN = -21562
SMX = -1856
```
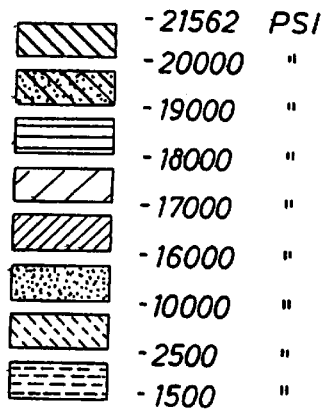
-21562 PSI
-20000 "
-19000 "
-18000 "
-17000 "
-16000 "
-10000 "
-2500 "
-1500 "

177

ANSYS 5.0 A-31
FEB 24 1995
15:40:17
PLOT NO.1
ELEMENT SOLUTION
STEP = 1
SUB = 1
TIME = 7500
SX (NOAVG)
RSYS = 1
DMX = .003105
SMN = -7374
SMX = -540.839

-7374 PSI
-7000 "
-6000 "
-5000 "
-4000 "
-3000 "
-2000 "
-1000 "
-100 "

FIG. 19
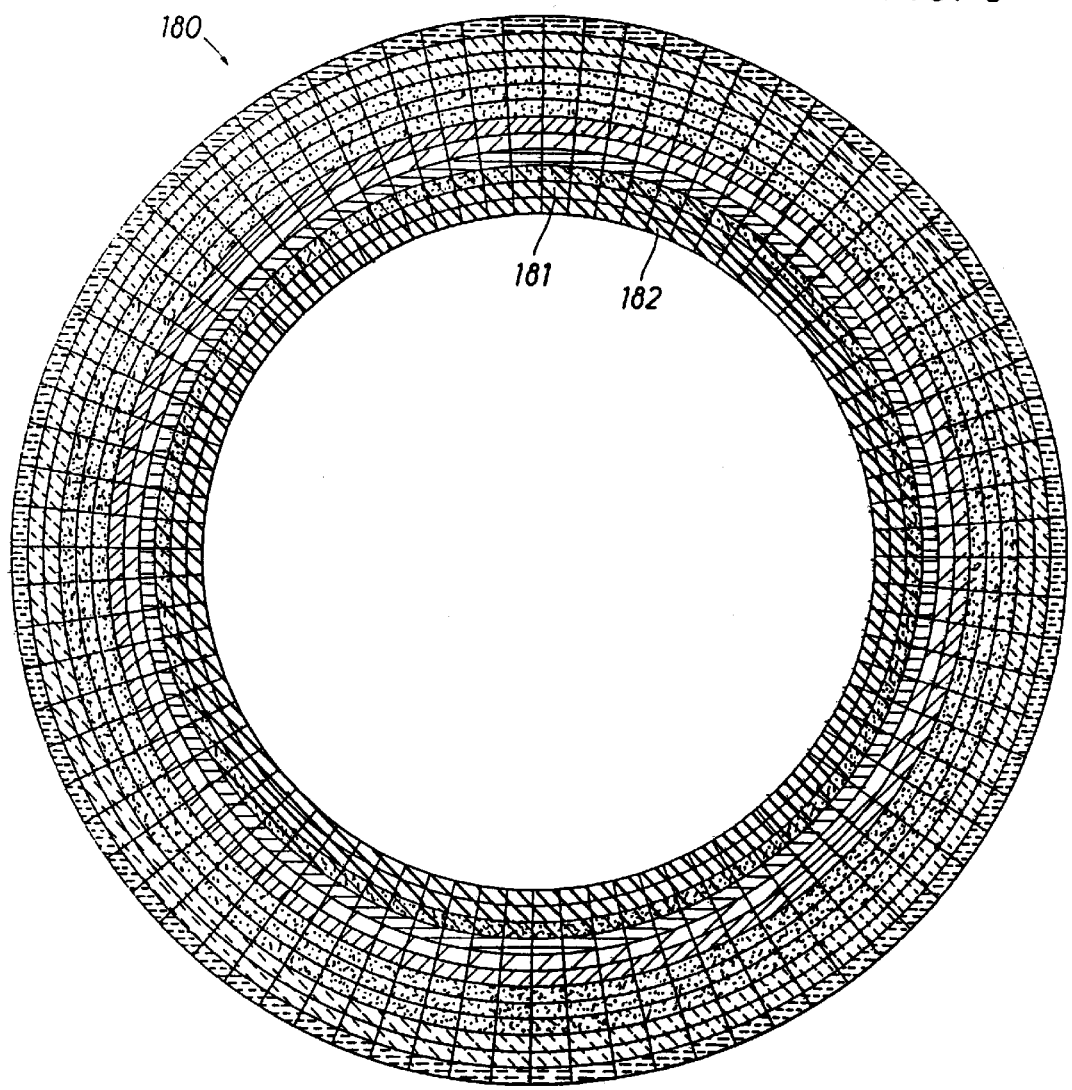
ANSYS 5.0 A-31
FEB 24 1995
16:33:45
PLOT NO.1
ELEMENT SOLUTION
STEP = 1
SUB = 1
TIME = 1
SX (NOAVG)
RSYS = 1
DMX = .008242
SMN = -17942
SMX = -375.37
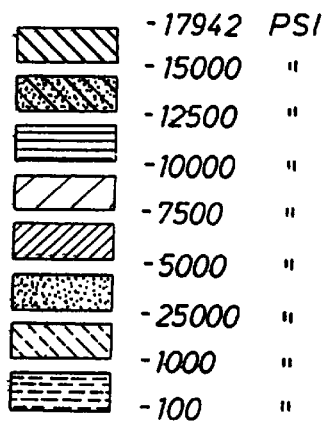

ANSYS 5.0 A-31
FEB 24 1995
16:11:50
PLOT NO.1
ELEMENT SOLUTION
STEP = 1
SUB = 1
TIME = 7500
SY (NOAVG)
RSYS = 1
DMX = .006658
SMN = -2595
SMX = 82720

-2595 PSI
6000 "
10000 "
15000 "
25000 "
40000 "
60000 "
70000 "
83000 "

FIG. 22
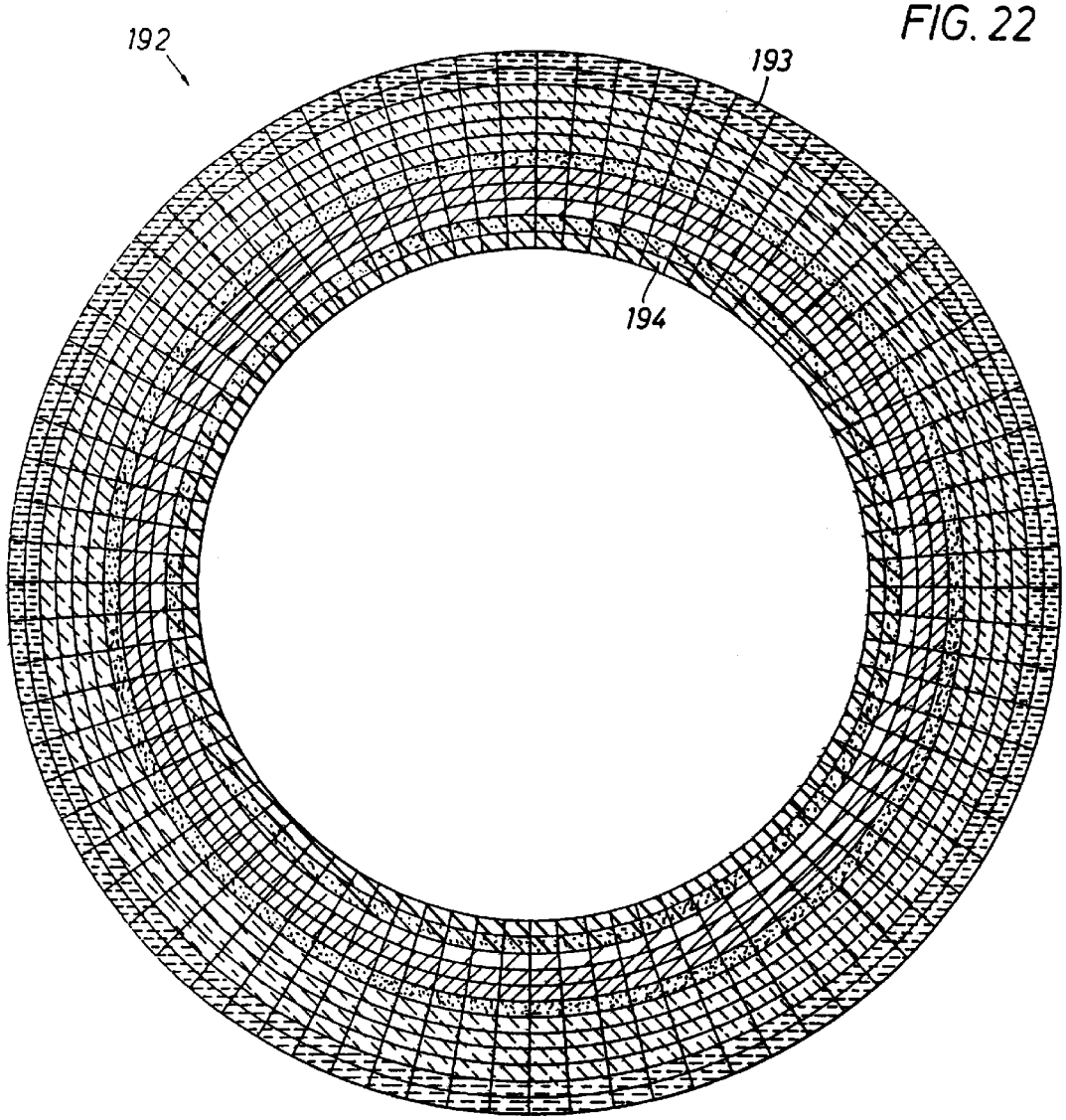
```
ANSYS 5.0 A-31
FEB 24 1995
15:52:45
PLOT NO. 1
ELEMENT SOLUTION
STEP = 1
SUB = 1
TIME = 7500
SX     (NOAVG)
RSYS = 1
DMX = .006658
SMN = -21001
SMX = -7154
```
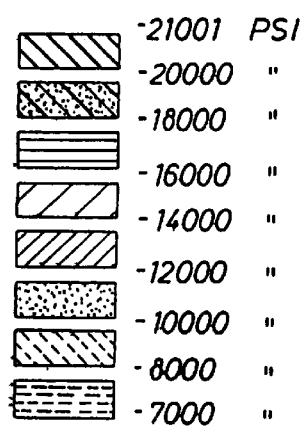

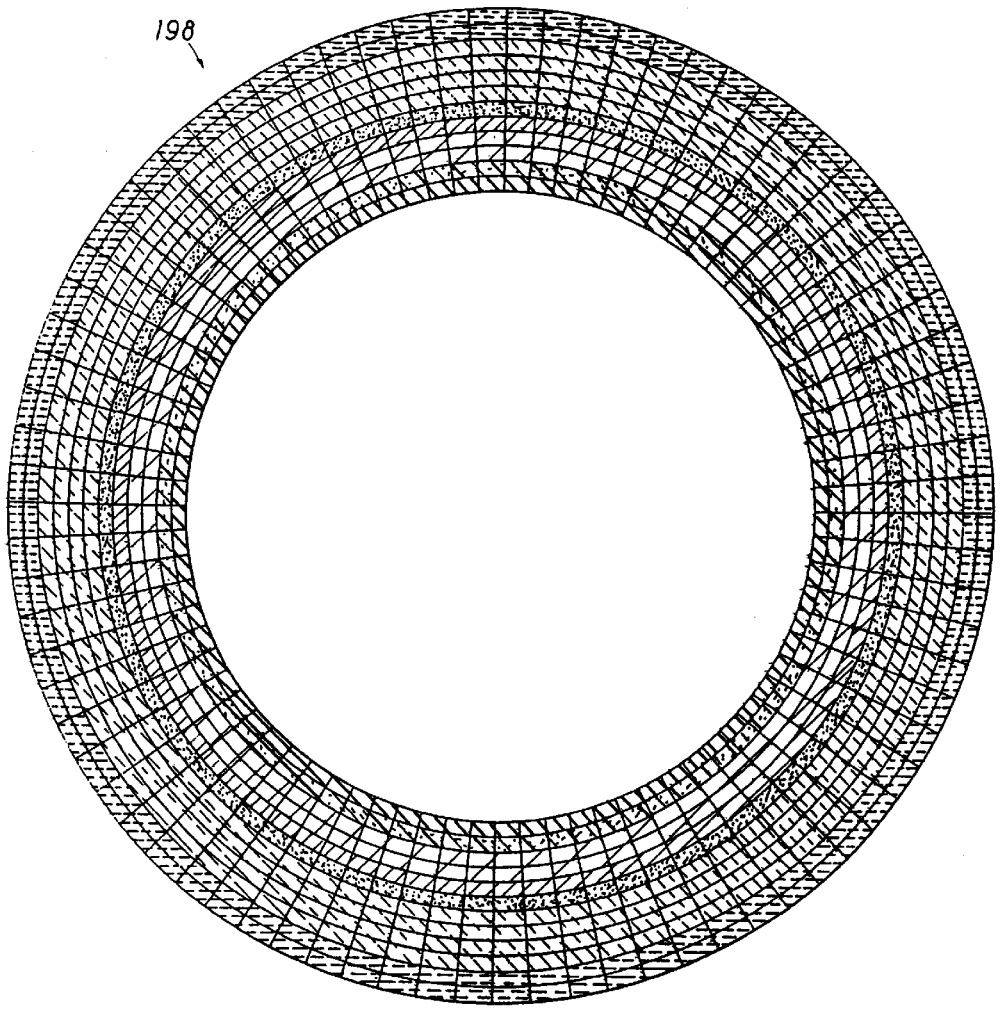
FIG. 24
```
ANSYS 5.0 A-31
FEB 24 1995
16:27:48
PLOT NO. 1
ELEMENT SOLUTION
STEP = 1
SUB = 1
TIME = 7500
SX  (NOAVG)
RSYS = 1
DMX = .00703
SMN = -20803
SMX = -7452
```
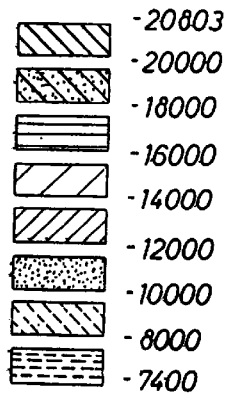

FIG. 25 (PRIOR ART)
FIG. 26
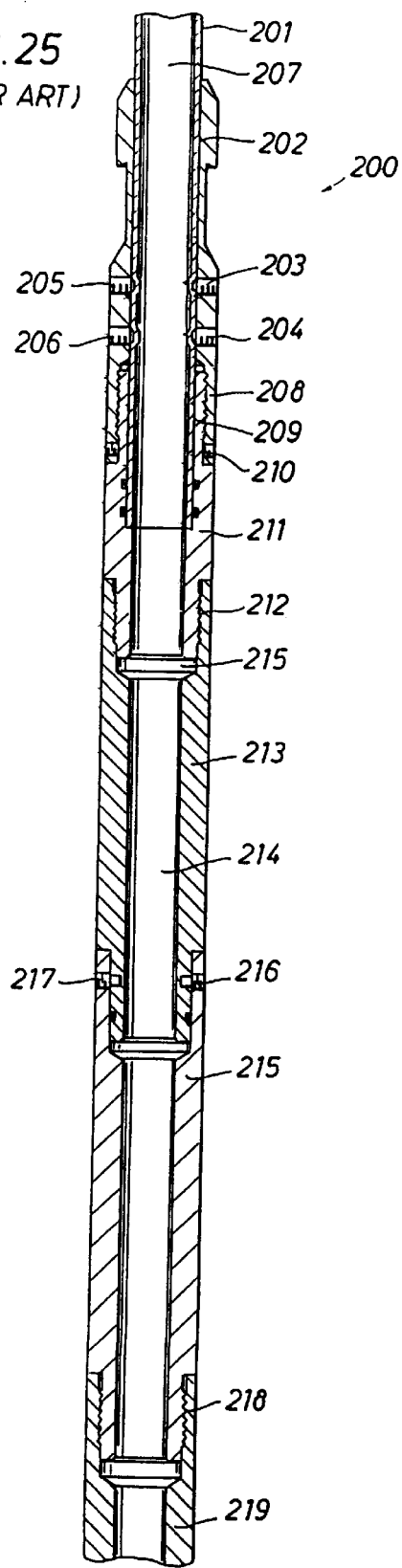
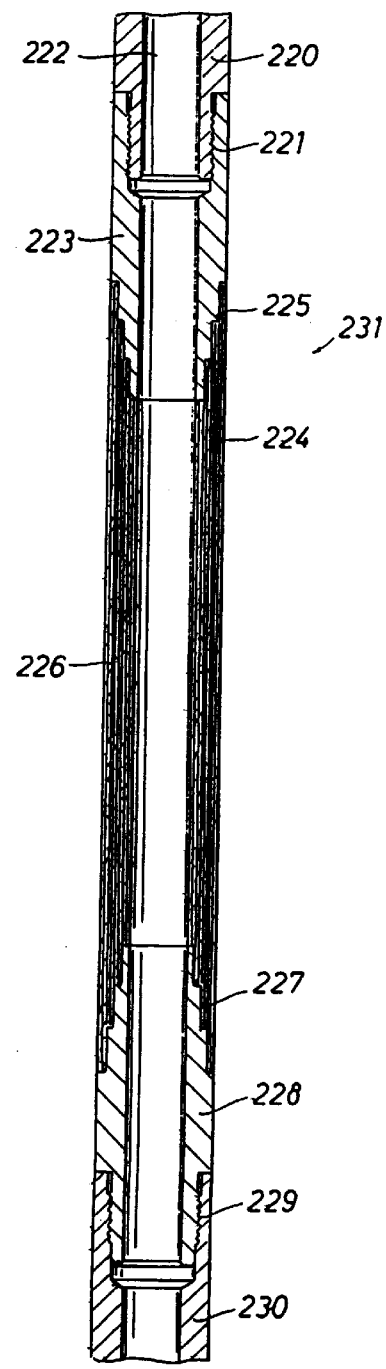

COMPOSITE COILED TUBING APPARATUS AND METHODS

This application is a continuation of application Ser. No. 09/013,417 filed Jan. 26, 1998 entitled "Composite Coiled Tubing Apparatus and Method", now U.S. Pat. 5,933,945; which is a division of application Ser. No. 08/593,634 filed Jan. 29, 1996, now U.S. Pat. No. 5,828,003 dated Oct. 27, 1998.

BACKGROUND OF THE INVENTION

1. Field of the Invention

The invention relates to improved methods and apparatus for servicing wells with coiled tubing and coiled tubing components comprised of composite fiber materials. In a preferred embodiment, fiber reinforced coiled tubing, provided as a layered laminate, is used within a wellbore to provide a strong and versatile coiled tubing for wellbore operations. In one embodiment, signals representing data may be transmitted along the length of the coiled tubing to the surface, providing useful information used in monitoring and directing coiled tubing operations. Further, composite disconnects are disclosed for disconnection of coiled tubing from tool strings facilitating retrieval of the coiled tubing from the wellbore.

Using this invention it is possible to vary the section modulus along the length of coiled tubing to improve buckling characteristics. Using intrinsic fibers for data communication is also part of this invention.

2. Description of the Prior Art

Coiled tubing is increasing in popularity as a method of conducting operations in an oil or gas wellbore. Historically, drilling pipe was used for drilling and conducting operations inside a wellbore, usually several hundred or thousand feet under the surface of the ground. However, drill pipe must be assembled in sections and lowered into the wellbore over a long time period of many hours or days. Coiled tubing emerged as a solution by providing a relatively fast and reliable method of conducting operations downhole within a wellbore, without using heavy and cumbersome jointed drilling pipe. Coiled tubing is used as a continuous strand, and therefore is easier and faster to use in many wellbore operations. Technological developments, improved service reliability, and the need to drive down industry costs have contributed to expanded uses for coiled tubing.

Modern coiled tubing operations are used to drill slim hole wells (wellbores of smaller than normal diameter), deploy reeled completions, log high angle boreholes, and deploy treatment fluids downhole. The use of coiled tubing in horizontal wellbores (i.e. wellbores that deviate from vertical) is increasing at a rapid rate.

In some instances, well treatment fluids are pumped downhole through the interior hollow space of the coiled tubing, and then are made available to the subterranean formation.

One of the primary limiting factors in coiled tubing workover applications, particularly in horizontal wells, is the depth to which coiled tubing can be pushed without locking or buckling in the production tubing, casing or open hole. The usefulness of coiled tubing is greatly limited by its inability to proceed farther into horizontal wells without buckling or locking within the wellbore. Coiled cubing is not rotated, but instead is pushed into and out of the wellbore. The frictional forces of the coiled tubing rubbing against the interior of the wellbore eventually overcome the integrity of the coiled tubing, causing buckling and lock up of the tubing in the wellbore. This phenomenon is illustrated in FIG. 4.

Another limiting factor that prevents the use of coiled tubing in deeper wells is the internal strength of the coiled tubing itself. Coiled tubing, when suspended in a wellbore, is subjected to the pull of gravity. Since a length of coiled tubing weighs several thousand pounds, the coiled tubing must have enough internal integrity and strength to withstand this force during operations without separating into two or more pieces. This problem is compounded when additional weight (such as drilling or completion apparatus) is placed on the distal end of the coiled tubing and lowered into the wellbore. Further, if the coiled tubing is restricted due to frictional forces or "hangs" within the wellbore, the additional force necessary to pull the coiled tubing free is added to the weight forces, thereby working to undesirably separate the coiled tubing at its weakest point.

Another criteria for coiled tubing is that it must be capable of being spooled onto a reel for storage, and for transport to the well site. Coiled tubing reels are deployed from trucks for land based wells, and from ships for servicing offshore wells. The most practical way to handle relatively long lengths of coiled tubing is to spool the tubing upon a reel. However, spooling a length of coiled tubing onto a reel subjects the tubing to bending forces that can damage the coiled tubing, and sometimes make it difficult to properly store and deploy the tubing.

The design of coiled tubing is complicated by the fact that the tubing must show sufficient strength to conduct the coiled tubing operations downhole without failure or buckling, while at the same time being flexible enough to be spooled onto a reel after the operation is complete. Unfortunately, coiled tubing that has a high section modulus and is therefore advantageous as to its strength and buckling characteristics downhole is difficult to spool onto a reel. The properties that make tubing work well downhole (i.e. stiffness) also work to disadvantage on the surface of the ground when attempting to spool the tubing.

What has been needed in the industry for some time is a coiled tubing that is stronger and more resistant to the forces encountered within a wellbore, but at the same time is easily spoolable, facilitating tubing operations in deeper wells. A coiled tubing that can be used in deeper wells, and also is capable of extended reach into horizontal wells is needed.

One additional problem encountered in coiled tubing operations is that the amount of real time information available to a coiled tubing operator during coiled tubing operations currently is very limited. A need exists for a reliable method and apparatus for sending signals from the lower portion of the wellbore to the surface. Signals could be converted to data that is used, for example, to monitor the properties of the coiled tubing, events outside and/or inside any length or a particular length of coiled tubing or to monitor the operation of downhole tools mounted upon the distal end of the coiled tubing. In some cases of pumping fluids through the coiled tubing, an apparatus could be used to monitor the leakage from the tubing, or perhaps monitor the integrity of the coiled tubing. This apparatus would be integral to the composite coiled tubing.

In many instances, it is very important to know reliably the exact depth of the coiled tubing in the wellbore, or in some instances, the exact point in the formation that corresponds to the downhole tool or other apparatus mounted on the end of the coiled tubing. There is needed a method or apparatus by which a coiled tubing operator may operate coiled tubing in a manner to know exactly (or within very narrow limits) the location of the tubing in relationship to the subterranean formation for use in isolating zones, providing diverting fluids, etc. to a specific portion of the reservoir.

Another significant problem in coiled tubing operations is the method and apparatus for disconnection of coiled tubing from tool strings during coiled tubing operations. Typically, either mechanical or hydraulic disconnects have been used in coiled tubing applications. However, there are problems with mechanical and hydraulic disconnects.

The disconnects, which are run above the tool string, facilitate release of the tool string by the tubing in the event the tool string becomes lodged in the hole. The alternative would normally result in tensile failure of the tubing close to the well head (near the surface of the ground at the reel end of the tubing), thereby complicating tubing retrieval. A disconnect may also be desirable at a length from the distal end for allowing the lower length to be left in the hole. Thus disconnecting the tool string from the tubing is necessary in many instances.

If is difficult to predict exactly at what load mechanical disconnects will fail. This is because such disconnects typically use a small number of studs or screws that are designed to fail at a pre-set load. A problem with such mechanical disconnects is that the failure load range is fairly broad due to the indefinite tolerances of the failure mechanism.

What is needed in the industry is a disconnect that will fail at a relatively narrow range or exact load rating. Predictability in failure load, and failure at a narrow load range, is desirable. Further, a disconnect that can be activated on demand would be desirable, because it would eliminate the uncertainty associated with known methods of disconnection, and would permit an operator to disconnect on demand.

SUMMARY OF THE INVENTION

The invention comprises several embodiments and combinations. In one form, it comprises composite coiled tubing that resists buckling within the wellbore comprising a substantially cylindrical hollow tube having a reel end and a distal end adapted for insertion into a wellbore.

Several layers may be present, including a cylindrical surface layer and a cylindrical composite fiber layer. The latter is preferably concentrically inside of the surface layer, the composite fiber layer formed by weaving composite fiber in a predetermined pattern whereby the fibers are oriented in relationship to the longitudinal direction of the coiled tubing such as to provide appropriate strength and buckling characteristics to the coiled tubing.

It is advantageous to provide the fibers in an orientation such that the modulus strength of the composite coiled tubing is dependent upon the orientation of the woven fibers, wherein the angle formed by the fiber as compared to the longitudinal direction of the coiled tubing are changing near the reel end of the tubing and the distal end of the tubing.

A cylindrical liner layer typically is concentrically inside the composite fiber layer, said cylindrical liner layer being chemically resistant to abrasive fluids, wherein conductive fibers are provided within the composite coiled tubing, the fibers being adapted to transmit signals representing data.

A composite disconnect on the distal end of the composite coiled tubing may optionally be provided. The disconnect typically would have a plurality of fibers of varying strength and perhaps varying orientation mixed into a fiber blend, wherein the load range at which the composite disconnect fails corresponds to the failure characteristics of the fiber blend, the fiber blend having a predetermined failure limit.

Importantly, one aspect of this invention is that the composite coiled tubing is adapted to resist buckling within the wellbore.

The composite coiled tubing of also may advantageously include conductive fibers adapted to transmit signals representing data for many different and varied useful purposes. For example, the data may be used to facilitate monitoring the structural integrity of the coiled tubing, to monitor breakage or leakage of the coiled tubing. Data may also be used for learning the strains at particular location on the coiled tubing.

Fiber optics optionally could be incorporated into the fiber blend layer as well. One embodiment could use fiber optic materials to monitor the coiled tubing by measuring the refraction within optical fibers, and thereby determining the weakest point of fatigue, in the coiled tubing by comparison with previously measured refraction indices for that particular tubing.

A method of disconnecting a tool string from coiled tubing is also provided as one aspect of the invention. This is done to facilitate retrieval of the coiled tubing. In general, the method includes providing a composite disconnect. The disconnect removably interconnects coiled tubing to a tool string, the composite disconnect being adapted for failure at a predetermined load range. At that point, it is feasible to insert coiled tubing into a wellbore, the coiled tubing having a reel end and a distal end, the distal end having attached a tool string secured by a composite disconnect.

It is possible to disconnect the distal end of the coiled tubing from the tool string at a predetermined load range, thereby facilitating retrieval of the coiled tubing from the wellbore. In many cases, it is advisable to provide a composite disconnect comprising a plurality of fibers of varying strength and orientations mixed into a fiber blend, wherein the load range at which the composite disconnect fails corresponds to the failure characteristics of the fiber blend.

The fiber blend may comprise one or more fiber types. Chemical, thermal, or other means of providing for disconnection may include contacting the composite disconnect with acid, thereby degrading the composite disconnect, facilitating release of the tool string from the distal end of the coiled tubing. Other methods of breaking down the fiber connection could be used.

In one aspect of the invention, it is possible to provide gravel packing apparatus for a well comprising a perforated composite gravel packing screen. The gravel packing apparatus could include perforations comprising predetermined leak paths which are chemically removable at will, providing the filtering function to the screen.

DESCRIPTION OF THE PREFERRED EMBODIMENTS

The invention is shown in FIGS. 1–29.

FIG. 1 shows the coiled tubing operation of the invention in a typical configuration of a horizontal wellbore;

FIG. 2 snows a more detailed view of the above ground components used to facilitate the coiled tubing operations;

FIG. 3 reveals provides a more detailed observation of the components that directly drive coiled tubing into a well and also the configuration that results in bending events upon the coiled tubing;

FIG. 4 demonstrates the drive mechanism and how it operatively connects to the tubing in such a way that buckling of coiled tubing may occur inside the casing of a wellbore;

FIG. 5a depicts sinusoidal buckling of coiled tubing;

FIG. 5b depicts a cross-sectional view of that shown in FIG. 5a of the casing containing sinusoidally buckled coiled tubing;

FIG. 5c shows helical buckling of coiled tubing;

FIG. 5d is a cross-sectional view of FIG. 5c or the casing containing the helically buckled coiled tubing;

FIG. 6a shows a preferred embodiment of the invention of the composite coiled tubing with a solid liner inner layer and several different fiber layers overlaying the solid liner inner layer;

Figure 7:
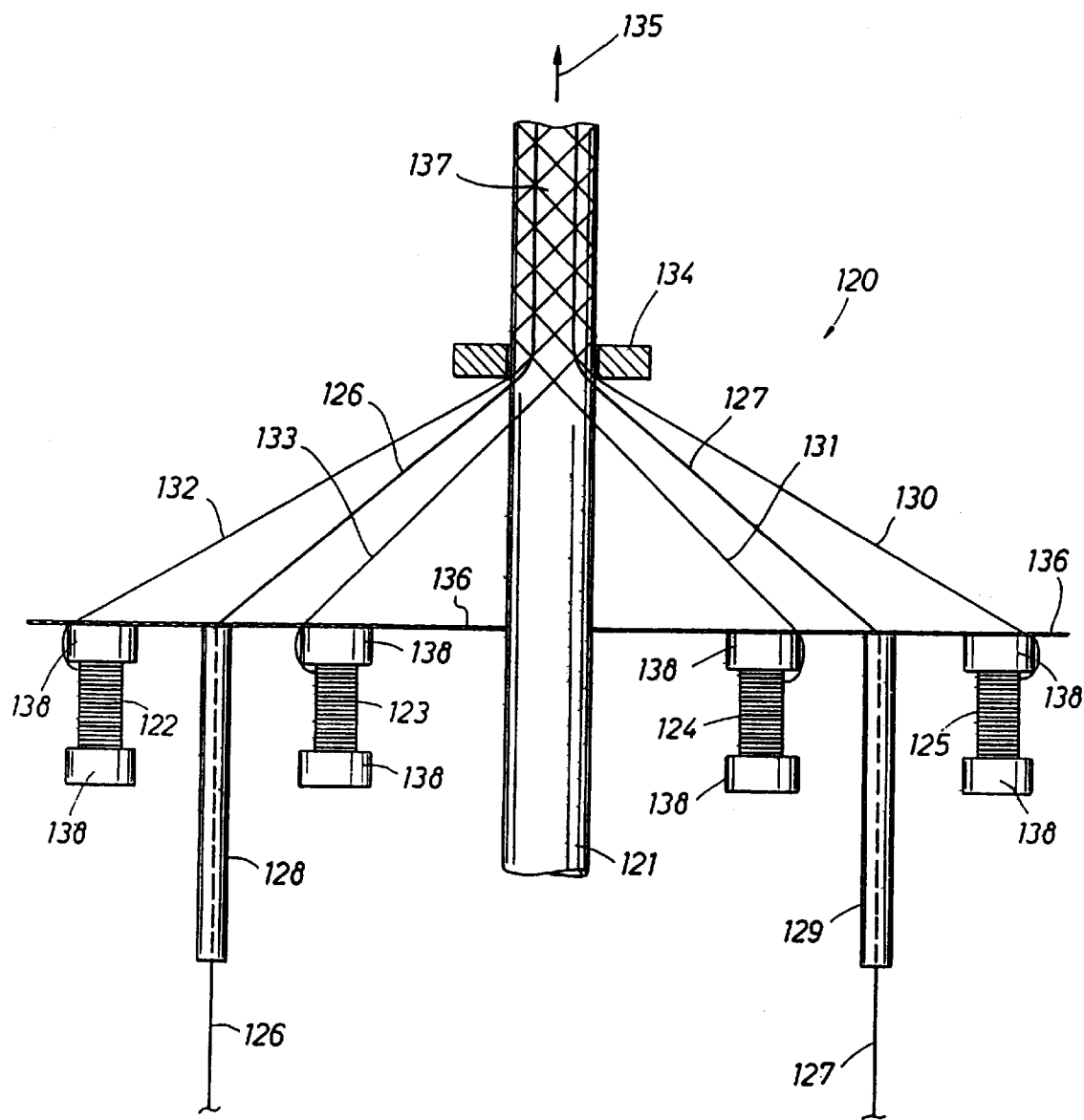
Figure 8:
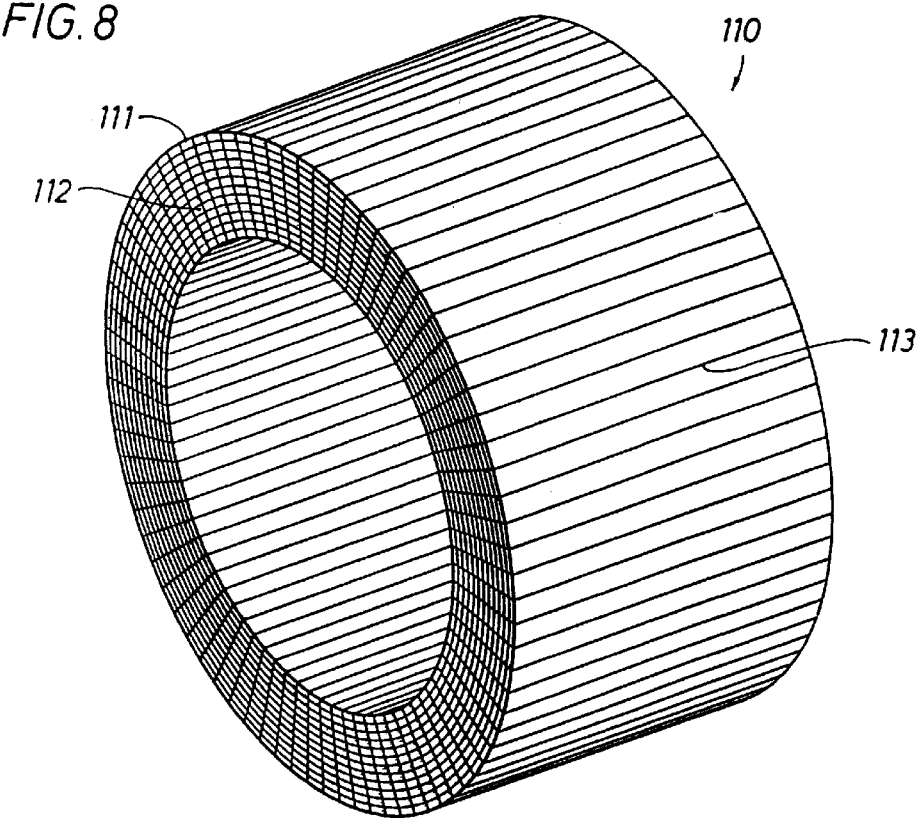
Figure 9:
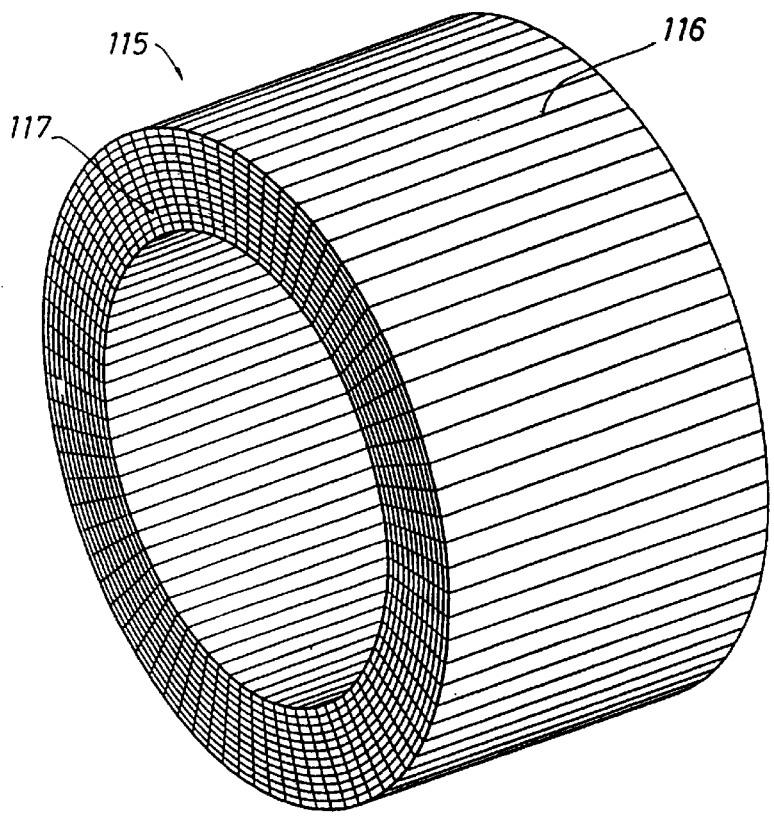
Figure 12:
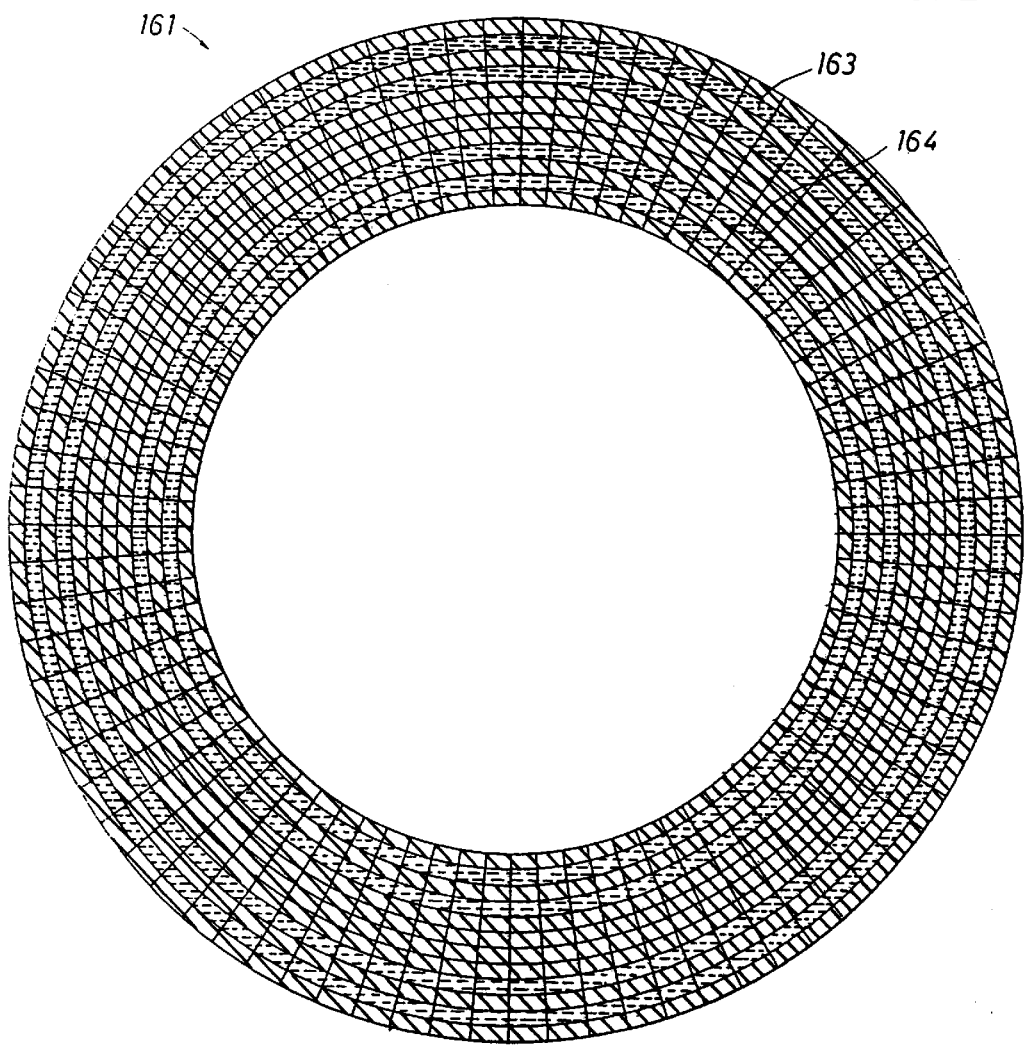
Figure 13:
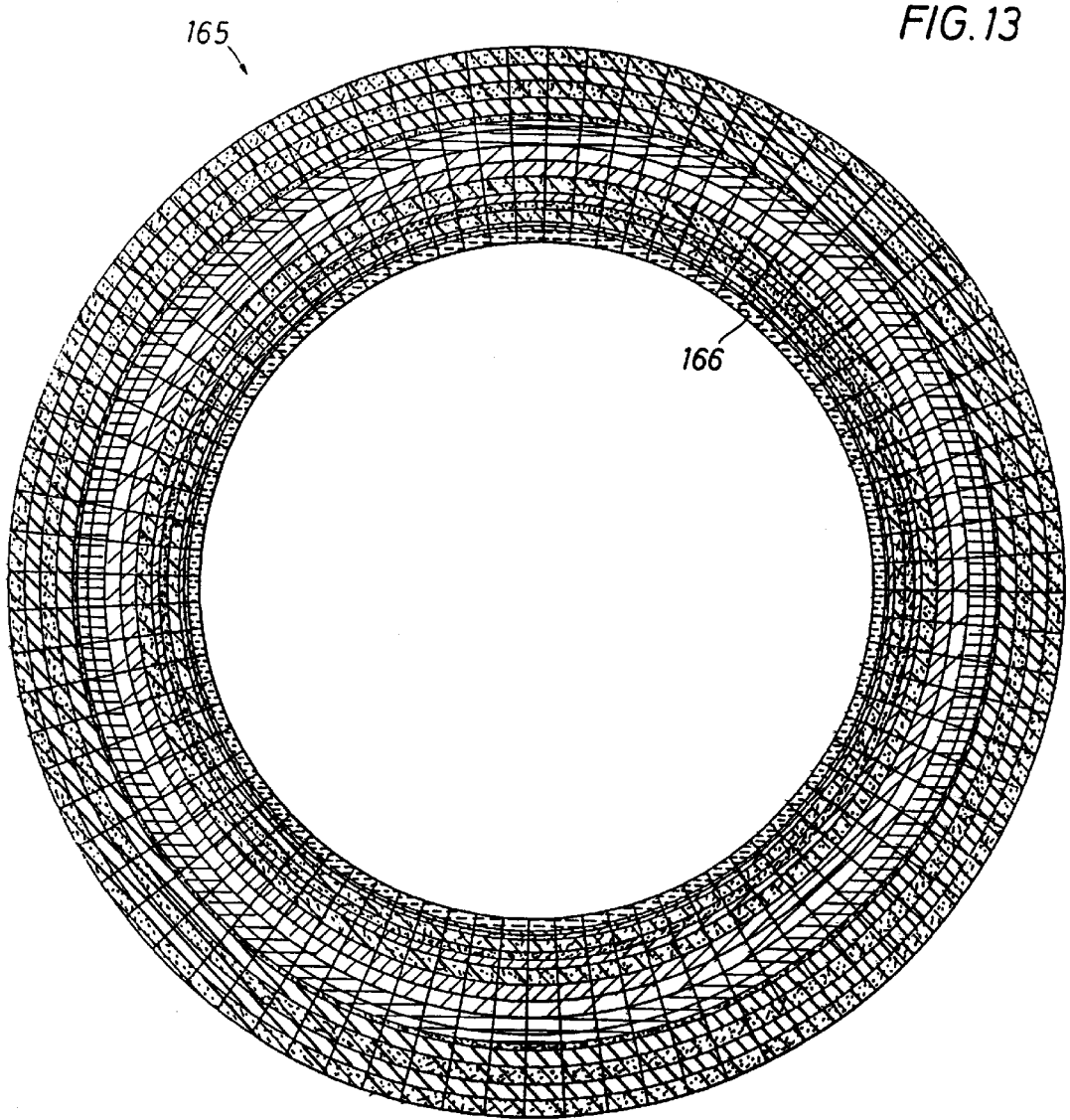
Figure 16:
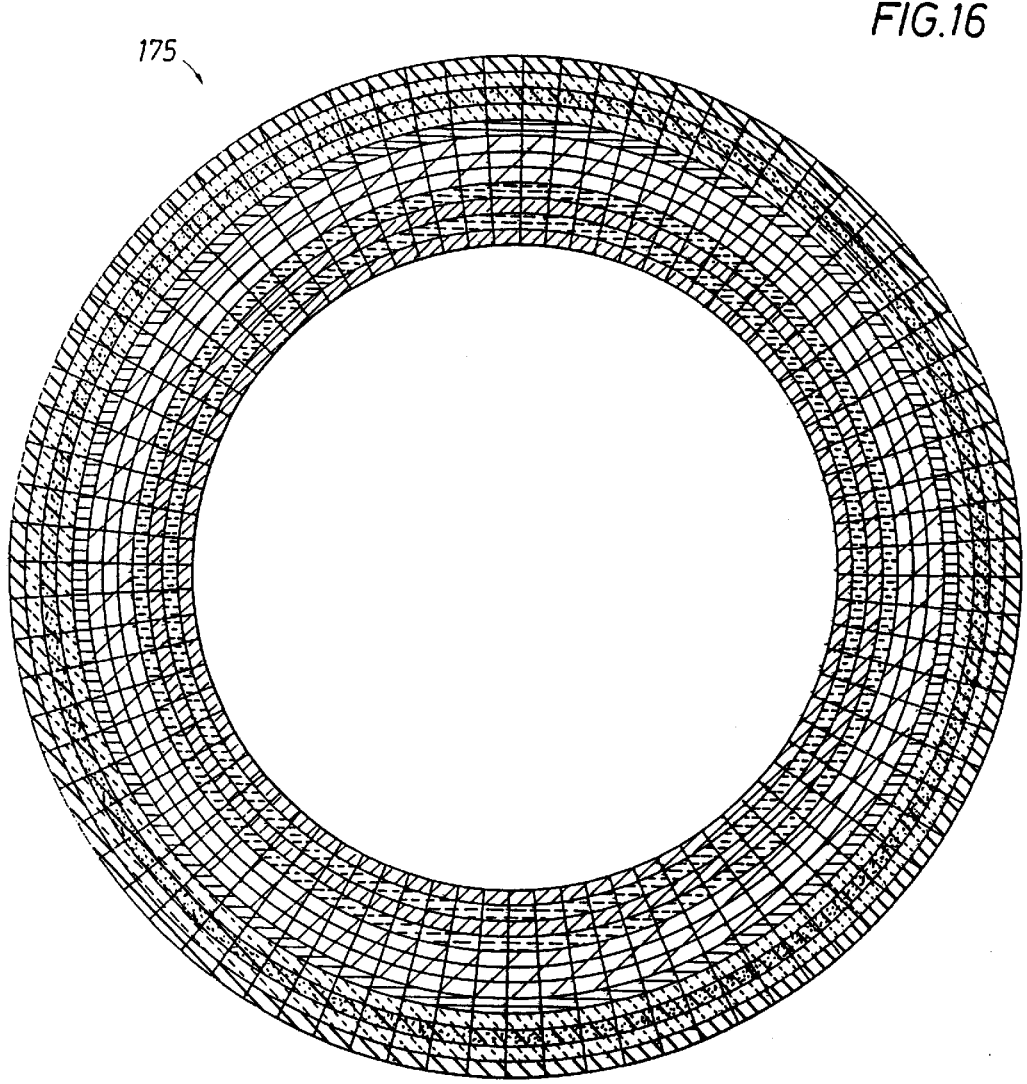
Figure 17:
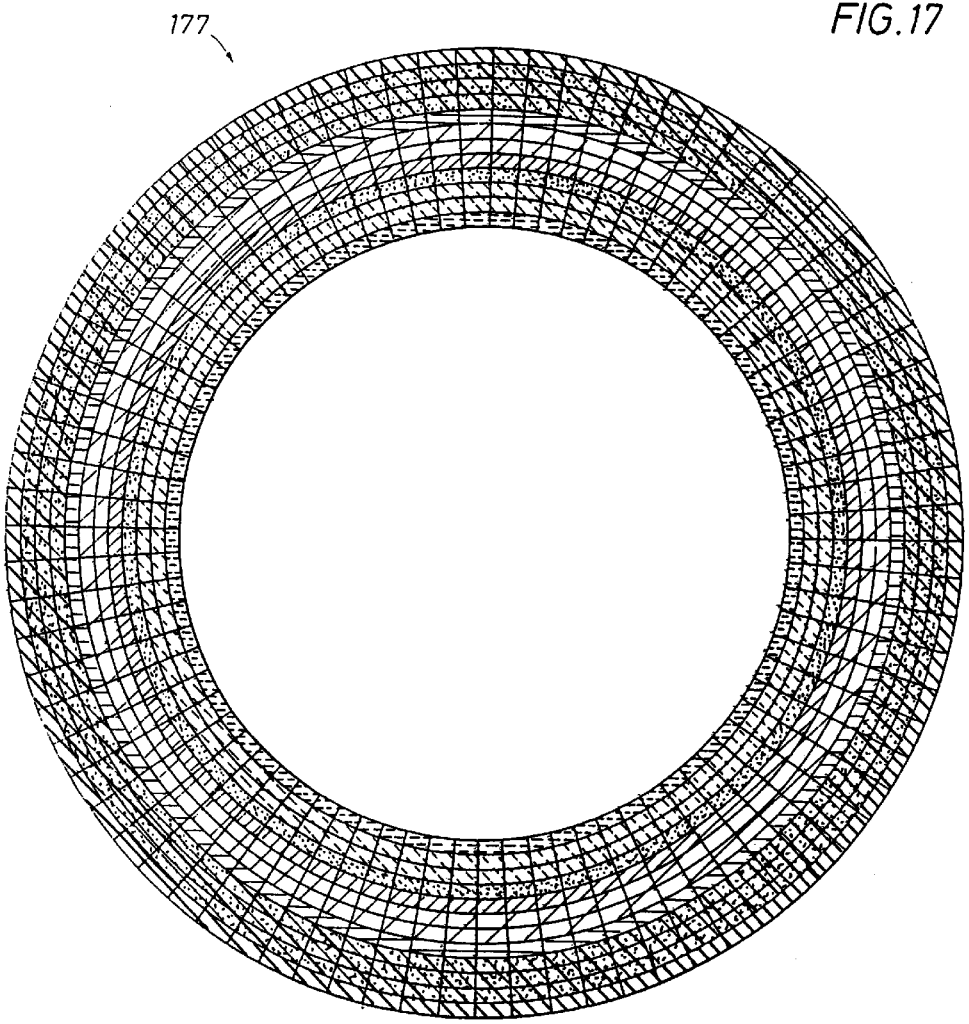
Figure 18:
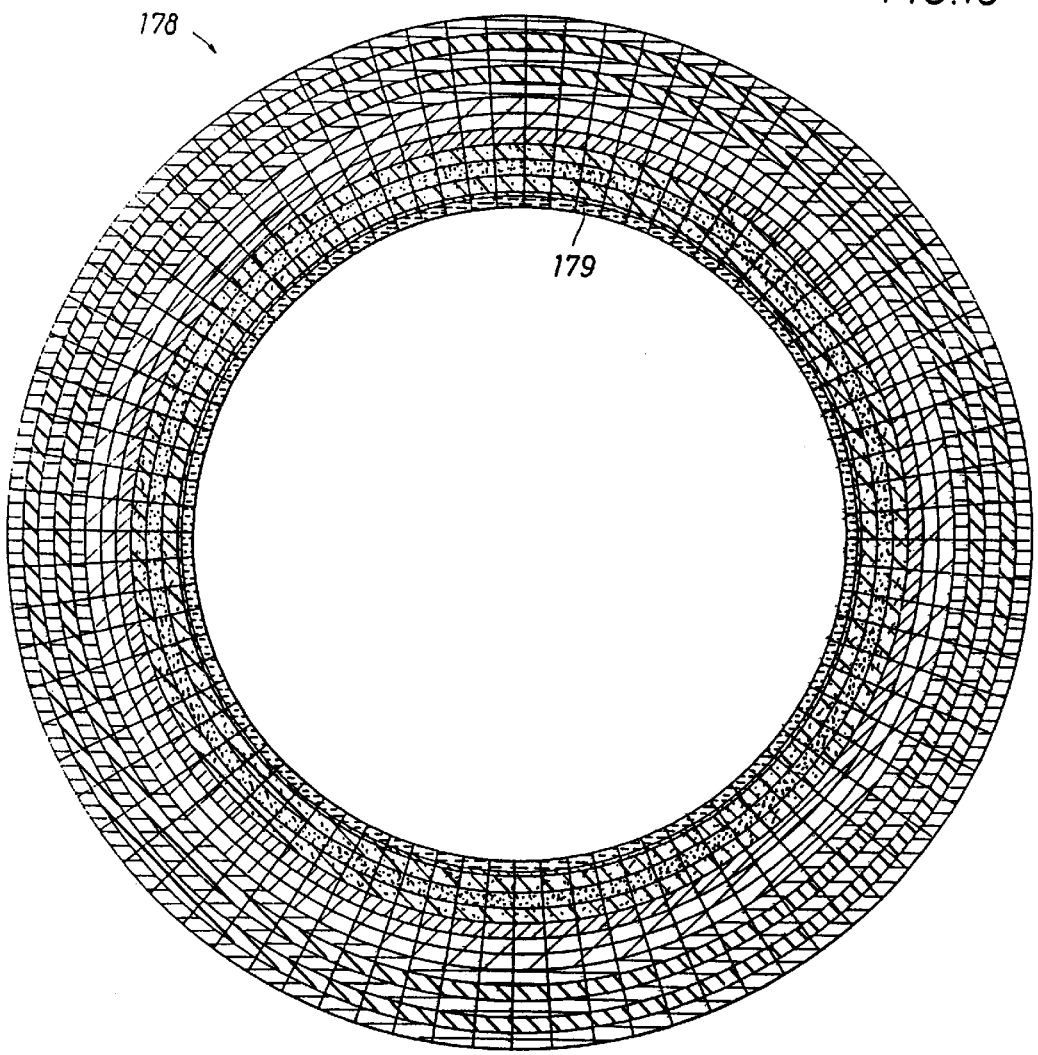
Figure 20:
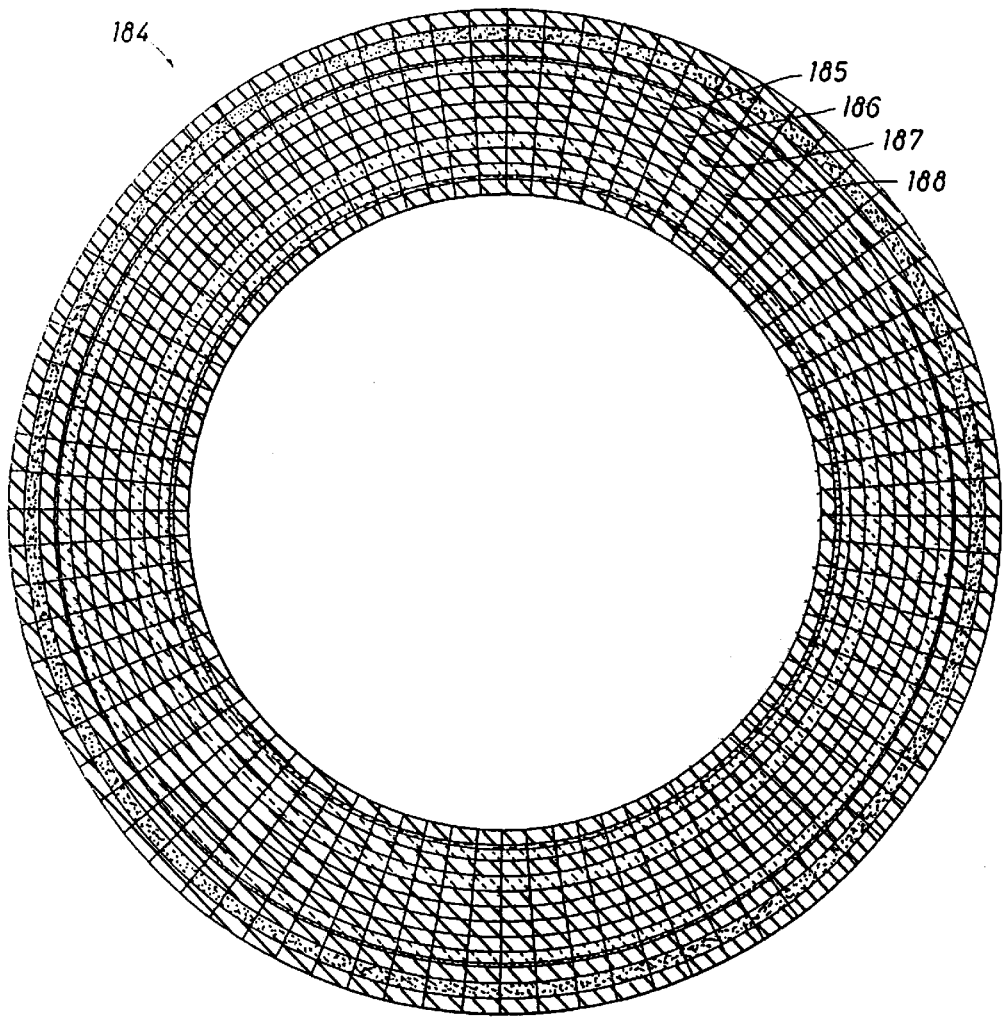
Figure 21:
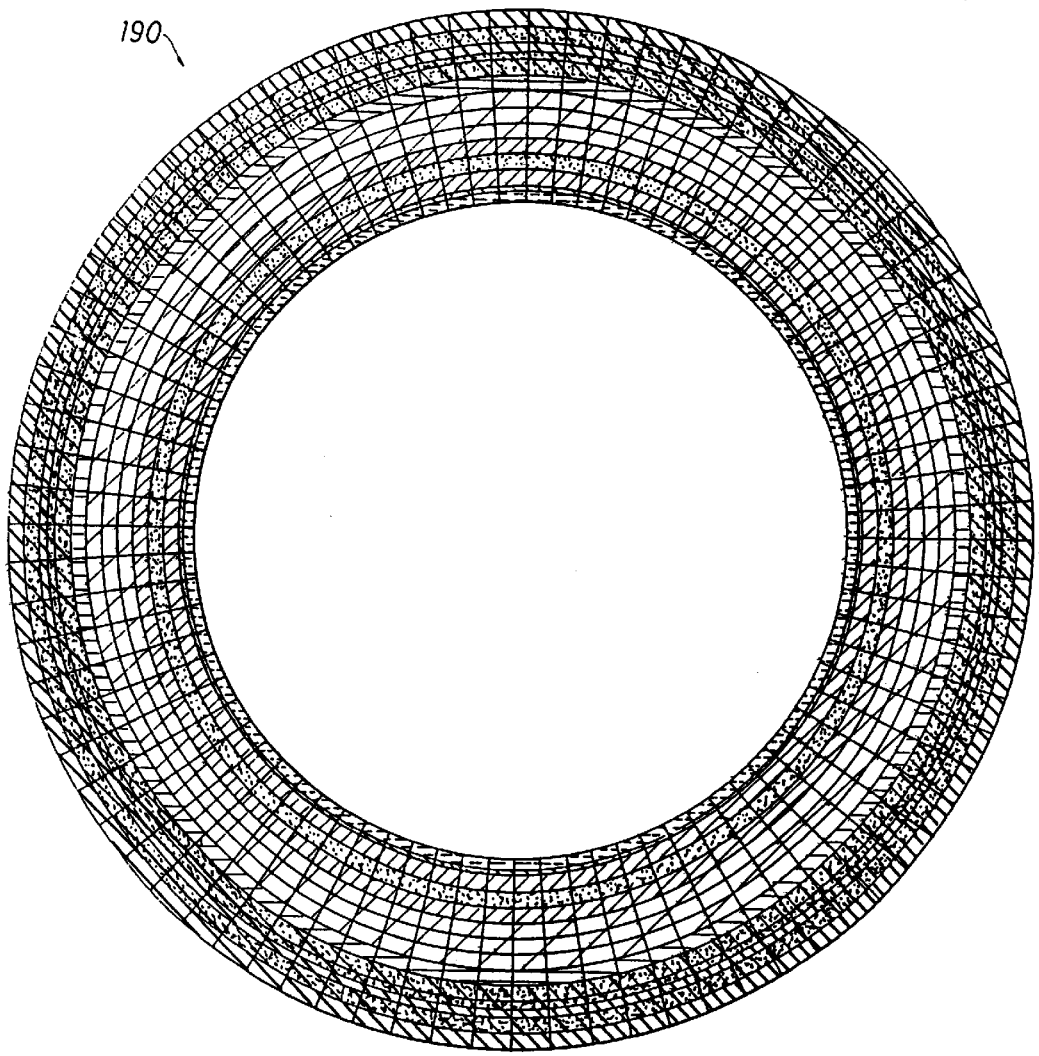
Figure 23:
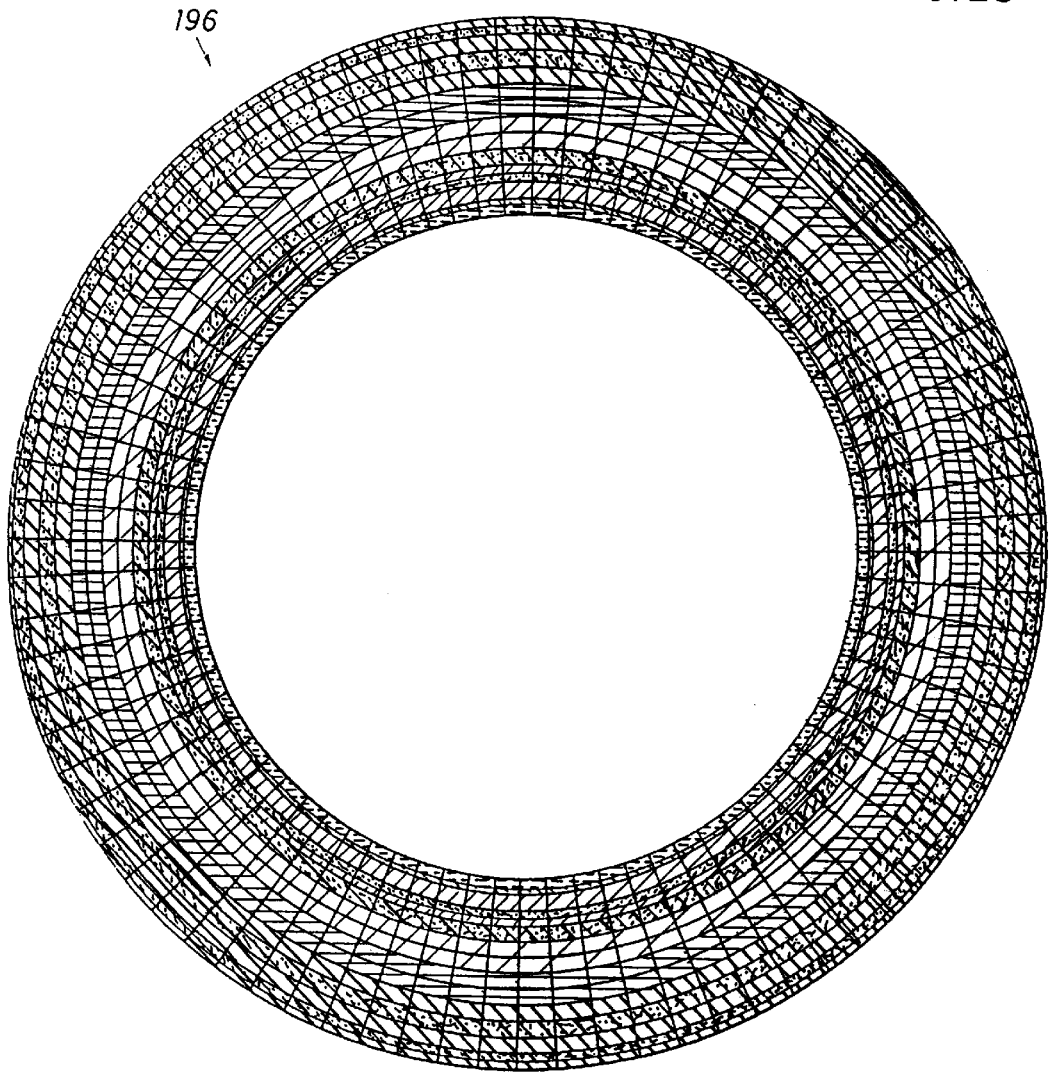
Figure 27:
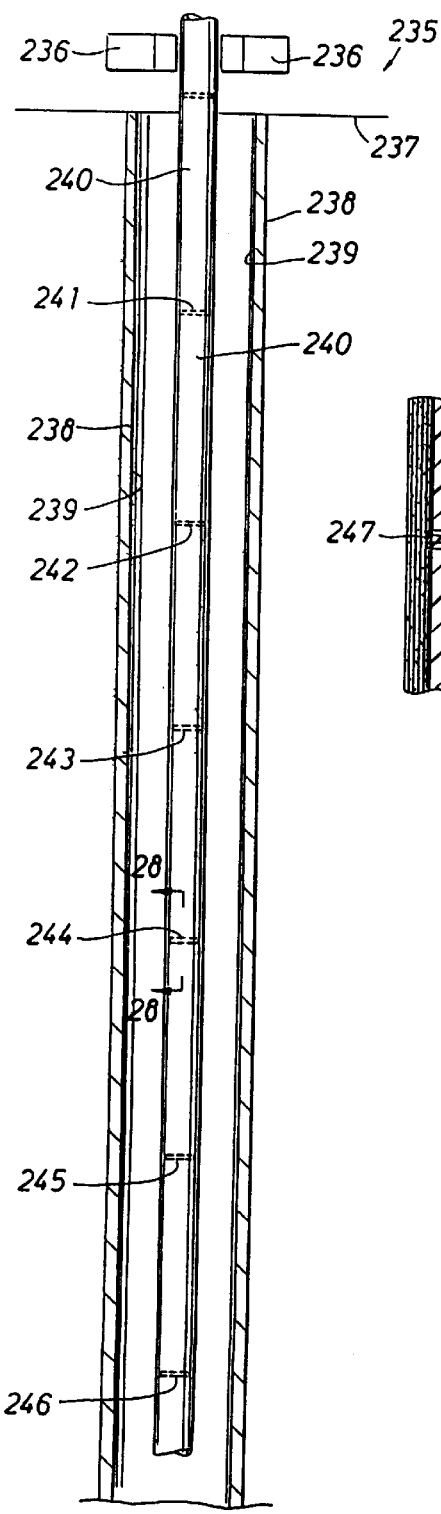
Figure 28:
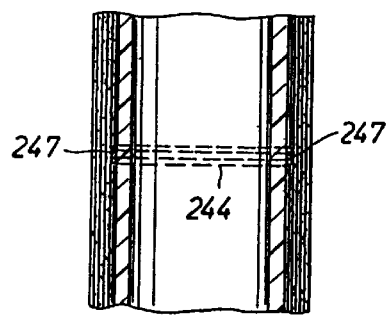
Figure 29:
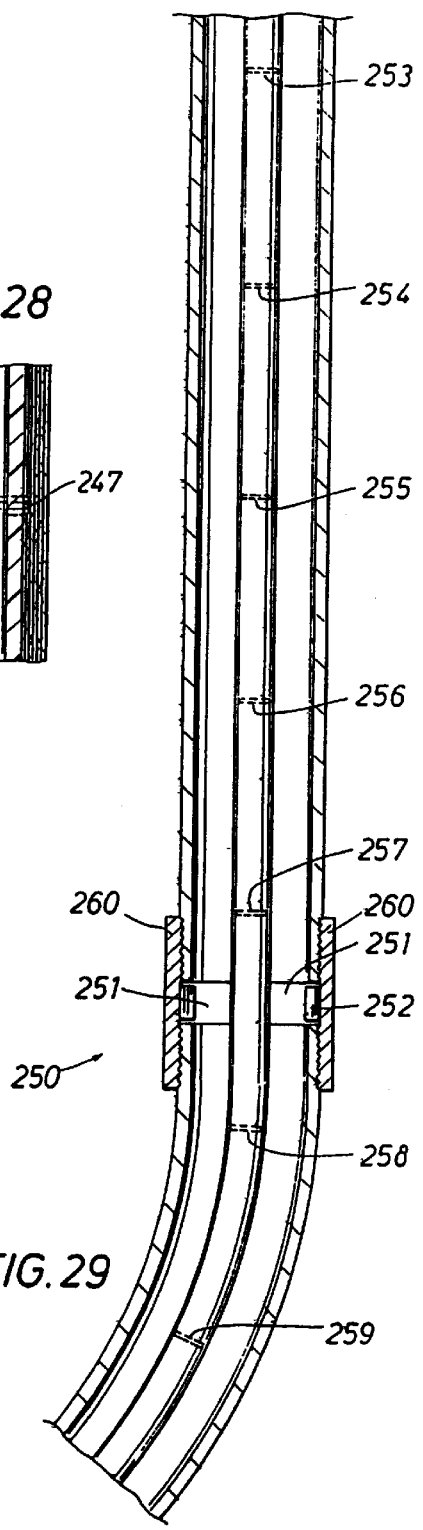

FIG. 6b demonstrates an alternate embodiment of the composite coiled tubing which uses a weave without an inner mandrel;

FIG. 6c presents yet another alternate embodiment of the composite coiled tubing invention;

FIG. 6d shows a further alternate embodiment of the composite coiled tubing invention;

FIG. 6e depicts a cross section of composite coiled tubing containing conductive wires;

FIG. 7 depicts a sketch of an automated circular braiding machine configuration of the type used to manufacture composite coiled tubing;

FIG. 8 shows a three dimensional solid finite element model of a composite coiled tubing laminate;

FIG. 9 shows a three dimensional solid finite element model of regular steel containing one element;

FIG. 10 depicts axial stress in composite coiled tubing that is wound (and therefore deformed) on an 84 inch circular reel;

FIG. 11 shows axial stress in composite coiled tubing that is wound upon (i.e. deformed) on a 96 inch circular reel;

FIG. 12 demonstrates the axial stress load for case B (case scenario "B" is presented later in the specification);

FIG. 13 demonstrates the axial stress load for hoop stresses for load case B;

FIG. 14 presents radial stress characteristics for load case B;

FIG. 15 depicts axial stress for load case C (case scenario "C" is presented later in the specification);

FIG. 16 shows hoop stresses for load case C;

FIG. 17 demonstrates radial stress for load case C;

FIG. 18 presents hoop stress for load case D (load case scenario "D" is presented later in the specification);

FIG. 19 shows radial stress for load case D;

FIG. 20 presents axial stress for load case E (load case scenario "E" is presented later herein);

FIG. 21 presents hoop stress for load case E;

FIG. 22 shows radial stress for load case E;

FIG. 23 presents hoop stress for load case F (load case "F" is presented later herein);

FIG. 24 depicts radial stress for load case F;

FIG. 25 shows a typical prior art configuration for a downhole connection means to connect coiled tubing to a downhole tool;

FIG. 26 shows one embodiment of the invention of the composite disconnect of this invention;

FIG. 27 reveals a magnetic marking depth calculating configuration of the present invention that serves to calculate depth using magnetic marker materials embedded within the composite laminate of the coiled tubing;

FIG. 28 shows a detailed view of the magnetic nodes that operate to provide depth data in the configuration of FIG. 27;

FIG. 29 depicts an alternate configuration of this invention in which the magnetic detector is located underground and acts to relay depth information to the surface.

Figure 1:
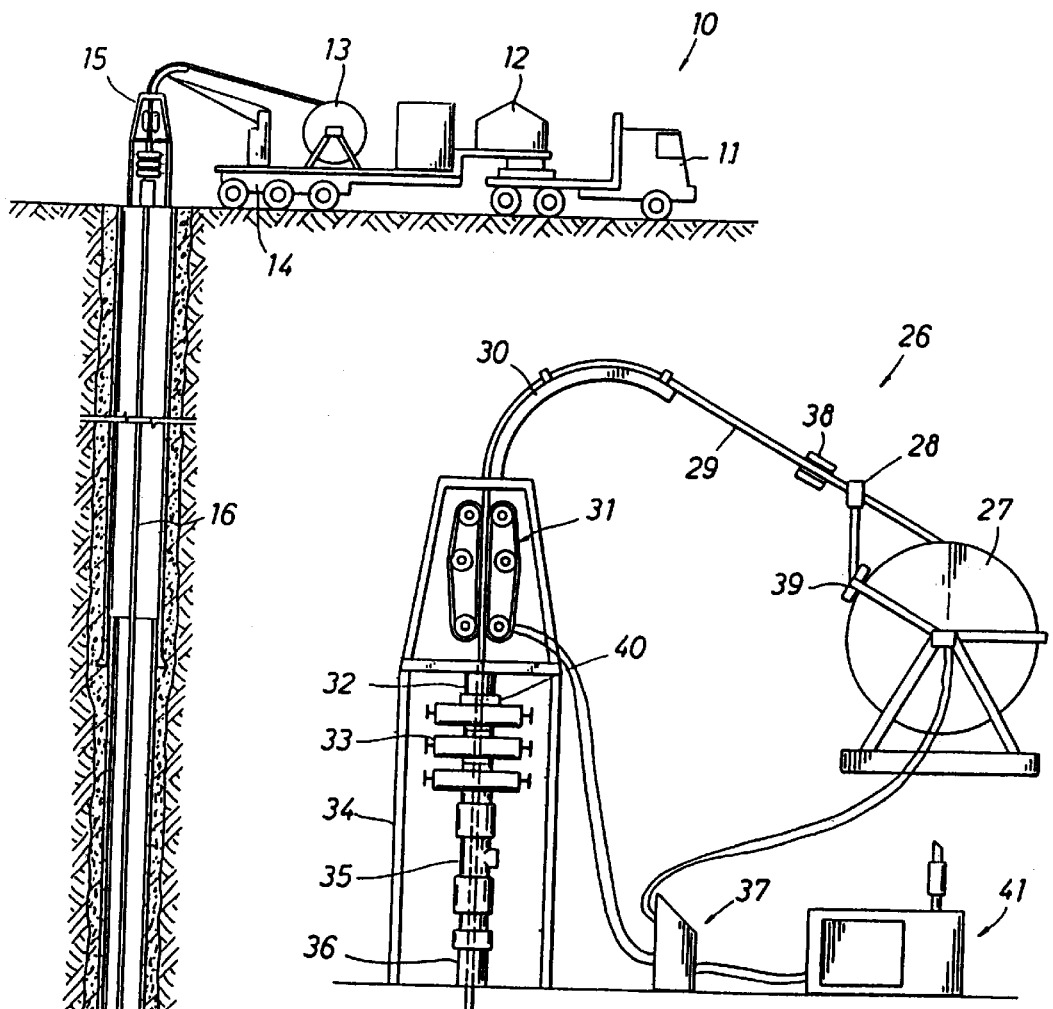

In FIG. 1, the operating environment of this invention is shown. Coiled tubing operation 10 is comprised of a truck 11 which supports power supply 12 and tubing reel 13. An injector head unit 15 feeds and directs composite coiled tubing 16 from the tubing reel into the subterranean formation. The configuration of FIG. 1 shows a horizontal wellbore configuration which supports a coiled tubing well trajectory 18 into a horizontal wellbore 19. This invention is not limited to a horizontal wellbore configuration, but is advantageously applied to that configuration. Downhole tool 20 is connected to the coiled tubing, as for example, to conduct flow or measurements, or perhaps to provide diverting fluids.

Figure 2:
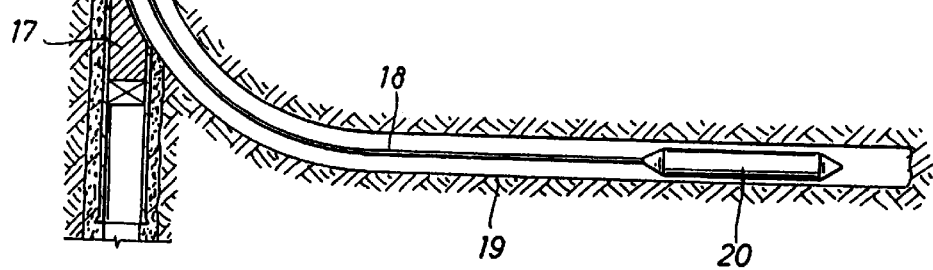

FIG. 2 represents a coiled tubing unit 26 having a hydraulic operated tubing reel 27 which feeds tubing 29 by way of levelwind 39 and past a depth counter 28. Tubing guide 30 directs the tubing downward into hydraulic (or electric) drive tubing injector 31 and past stripper rubber 32. A depth detector 40 is shown, which may be of the magnetic mark type detector. A tubing monitor 38, which measures the ovality and outer diameter of coiled tubing is provided. The tubing 29 is pushed into the well through blowout preventor stack 33 and through flow tee 35. Injector support 34 supports the injector over the wellbore. A power pack 41 supplies power to control console 37 for operation of the coiled tubing unit.

The forces and strain placed upon coiled tubing when it is used in a coiled tubing unit 44 is apparent from viewing FIG. 3. Coiled tubing undergoes numerous bending events each time it is run into and out of a wellbore. The tubing is plastically deformed on the reel. First, coiled tubing 46 is bent when it emerges from the reel 45. Then, it is bent as it passes over tubing guide 47, and is straightened as it goes into tubing injector 48 for entry into the wellbore. Of course, each bending event is repeated in reverse when the tubing is later extracted from the wellbore.

These bending events weaken the tubing each time it is used, and tubing use must be counted and tabulated, and tubing discarded, when it has been used beyond an acceptable safety limit. The composite tubing of this invention is designed to monitor tubing condition and even report data to the operator to show the condition of the tubing in real time during use. Cost savings can be achieved by knowing the exact condition of the tubing, and instances of catastrophic tubing failure can be substantially reduced or even eliminated by use of this invention. Cost savings can be realized since the fatigue life of composite coiled tubing will be substantially longer than that of steel. A more detailed description of the use of this invention is set forth below.

Tubing often buckles when it is places in deep wellbores, causing problems. Buckling is especially pronounced in horizontal and long reach wellbores because the tubing is subject to gravitational forces that cause large amounts of friction between the tubing and the wellbore. When this friction overcomes the forces pulling or pushing the tubing into the wellbore, buckling occurs. First, buckling is of the sinusoidal type, which is akin to a two dimensional wave in the tubing, as seen in FIGS. 5a and 5b. Later, as the tubing proceeds further into the wellbore, helical buckling occurs. Helical buckling is shown in FIG. 5c. Helical buckling is a more serious problem, and it is a "corkscrew" effect represented as three dimensional buckling, which eventually leads to total lock-up of the tubing. Helical buckling causes the tubing to be in contact with the inner surface of the wellbore at many (or even all points) which greatly increases the friction encountered by the tubing. Sensors embedded in the wall of the coiled tubing can be used to ascertain when this occurs. When total lock-up is reached, the tubing no longer can be pushed further into the wellbore, and further coiled tubing operations cannot be performed.

FIG. 5a shows a section 64 of sinusoidally buckled coiled tubing 65. Within wellbore casing 66 the tubing is in a sine-wave two dimensional form wherein it touches the casing at its peaks. Cross section shown in FIG. 5b shows wellbore casing 66 in contact with tubing 65 at its high and low points A two dimensional sinusoidal buckling is seen in FIG. 5b.

Helical buckling is seen in FIG. 5c, wherein the helically buckled tubing section 68 is characterized by helically buckled tubing 69 in a spiral or "corkscrew" three dimensional configuration within wellbore casing 70.

FIGS. 6a–6e shows various configurations of composite coiled tubing that may be employed in the practice of this invention, although other embodiments are possible. In FIG. 6a, first embodiment composite tubing 75 comprises solid liner 76 upon which is placed longitudinal fiber layer 77. Circumferential fiber layer 78 overlays the longitudinal layer, and weaved fiber layer 79 provides a weave of composite fibers at an angle of preferably about 45 degrees in each direction. However, other angles and orientations are possible to achieve different strength properties of the composite fibers. The composite fiber is formed on an apparatus as seen in FIG. 7, although it is anticipated that there may numerous methods and apparatus capable of forming such a composite tube which are known by those skilled in the art of composites. A suitable resin, such as epoxy resin, is impregnated into the fiber layers as they are formed, as seen later in FIG. 7.

FIG. 6b shows a second embodiment composite tubing 82 which does not have the solid liner, but instead contains an inner weaved layer 83 which contains an overlay of longitudinal fiber layer 84. On top of that layer, a circumferential fiber layer 85 is placed, and finally an outer weaved layer 86 provides the outer protective coating.

A third embodiment in FIG. 6c shows a different arrangement of fiber layers. Third embodiment composite tubing 90 is made of solid liner 91 upon which is placed longitudinal fiber layer 92. First circumferential fiber layer 93 is next, and longitudinal fiber layer 94 provides the next layer. Finally, second circumferential fiber layer 95 provides the outermost layer.

FIG. 6d shows fourth embodiment composite tubing 98 containing solid liner 99 with longitudinal fiber layer 100 on top of said solid liner. Circumferential fiber layer 101 is the next outermost layer, followed by longitudinal fiber layer 103, then circumferential fiber layer 109, followed by weaved fiber layer 102.

There are thousands of different laminates depending on the number of laminas (individual layers), materials and orientation of each lamina. In the specific use of coiled tubing, the desirable traits are contradictory in the two different load conditions (spooled and downhole).

The bending stiffness of the tube is determined by the number of axial fibers, the fibers modulus of elasticity and the location of the fibers in the cross-section. Adding more fibers and/or fibers with high moduli will result in a stiffer tube. More fibers can be used by either increasing the thickness of each lamina or adding more laminas. Placing fibers closer to the outer diameter results in a stiffer tube. These factors are considered in the design process.

Since composite materials typically do not yield before failure, the tubing must remain elastic when spooled on the reel. Therefore, a low bending modulus is desirable in this situation. However, when downhole, the buckling characteristics of the tubing are the controlling factors as to how far the tubing can be pushed downhole. The stiffer the tube, the farther it can be pushed downhole.

Therefore, different designs are beneficial depending on the job requirements. For example, if a large reel can be used the tubing can be extremely stiff and thus treat deeper wells. If small reels are required (imposed by transportation limitations) then only shallower wells can be treated.

FIGS. 6a and 6b illustrate tubing with virtually the same mechanical properties. The only difference is the liner. The inner provides two functions. The first is a mandrel for manufacturing and the second is to prevent leakage through the composite wall. The drawback is that it uses a substantial amount of space which limits the flow area of the tubing. Through experimental testing and manufacturing development it may be possible to replace the plastic liner with another composite lamina, as in FIG. 6b. Both of these tubes have axially stiff laminas which are close to the inner diameter. These tubes would be ideal for spooling on small reels and treating moderate death wells.

The tubes illustrated in FIGS. 6c and 6d are ideal for treating deeper wells using larger diameter reels. Additional axially stiff laminas are included which are located closer to the outer diameter, thus increasing the tubing stiffness. FIG. 6c is shown without the outer +/− 45 degree lamina which is purely used as a damage reduction or sacrificial lamina. It does not significantly affect the overall mechanical properties, but it instead prevents damage to the load bearing laminas.

FIG. 6e shows the coiled tubing arrangement 104 using a solid liner 105 surrounded by composite layer(s) 106. Included is conductive wires 107 and 108 located outside the inner solid liner layer. Any conductive wire may be used, but copper is preferable due to conductivity and low price. Alternate conductors would be inserted depending on the application. These would be thermal couple wires such as Iron Constantan, Chrome Alumel, Graphite, aluminum, nickel cobalt (MP35N) and other types of metals could also be used. Fibers which are magnetic due to proprietary processes or iron impregnation could also serve as a conductive medium. Attaching the wires in a straight axial line is easiest from a manufacturing standpoint. However, the wires will yield when the tubing is spooled onto a reel. This will result in an elongation of the copper wires. When the tubing is unspooled, the wires will be longer than the tubing. The wires will either buckle inside the tubing or protrude from the ends. Either case is undesirable. It would be preferential to attach the wires in a helix to prevent them from yielding.

The wires may be used to either communicate with downhole tools or to receive data from downhole tools, such as pressure gages or to communicate at one or various places in the coiled tubing. The inner solid layer or any other layer could also include a circuit board with processing capability.

FIG. 7 shows a schematic arrangement of the automated circular braider machine 120 that may be used to manufacture the composite tubing of this invention. Braiding machines and methods are known in the art, and the making of composite tubes has been accomplished for purposes other than coiled tubing. For example, composite tubes are known to be made and used for missile silos for ballistic missiles and other applications.

Mandrel 121 provides a form for construction of the composite. The composite fiber is wound or spun onto the mandrel from bobbins 122, 123, 124, and 125. Bobbin spools contain the fiber and prevent fiber entanglement or slippage. The mandrel forms the composite in pulling direction 135, and resin applicator 134 provides a continuous stream of resin impregnation to fill the matrix space existing within the fiber weave once it is formed. First axial 126, second axial 127 and first axial tube 128 and second axial tube 129 cooperate to construct fiber weave 137. The braiding plane 137 is actually circular and rotates as the mandrel proceeds towards the top of FIG. 7 during composite tube manufacture.

Fibers 130, 131 132, and 133 are weaved upon the mandrel by the rotation of The circular braider along braider plane 136.

Typically three different types of manufacturing processes are used to manufacture composite tubes. They are pultrusion, continuous filament winding and braiding.

Pultrusion is similar to the extrusion of plastics and nonferrous metals. The fibers are drawn through a die which has the desired final shape. In pultrusion, the fibers are pulled through the die; conversely, in extrusion, the material is pushed through the die. The resin can be impregnated into the fibers either prior to entering the die or after entering the die under pressure. The resin is rapidly cured in the die using head. A post-cure Module can be added after the curing/forming die.

Continuous filament winding is similar to forming wireline or cables. Spools of fiber are mounted or ring wonders which rotate about the workpiece. As the spools rotate, the mandrel moves at a specified speed forming the desired fiber orientation with the axial axis. Multiple winders are used to form the individual laminas with either different materials or different fiber orientations. Resin can be applied by running the fibers through a resin bath prior to winding. Alternatively, prepregged fibers can be used. The resin can then be cured on-line or off-line.

Braiding is similar to filament winding, except the fibers are interwoven onto the mandrel. This is accomplished with a braiding ring which contains spools moving in both a clock-wise and counterclockwise direction as well as moving radially which forms the over/under braiding sequence. The resin is cured in the same manner as the continuous filament winding technique.

The steps of the manufacturing process are largely dependent upon the complexity of the machinery. Typically, it is ideal to form all of the laminas in one run. However, this may require several winders/braiding heads which is expensive. Alternatively, multiple runs may be made in which one or two laminas are deposited each time. This method takes more time, but is significantly less expensive. The type of resin is dependent on the design parameters and the cure time for the resin is more dependent on the manufacturing process.

FIGS. 8–24 reveal finite element analysis test results that indicate the advantages of composite tubing in different load scenarios, as set forth below. Detailed discussion of those figures will accompany the discussion of test methodology and finite element analysis, including Examples 1–7 set forth in that portion of this specification.

FIGS. 25–29 relate to downhole composite connection means and apparatus. FIG. 25 shows a typical prior art configuration, while FIGS. 26–29 reveal the invention.

In the prior art, it is known generally to provide disconnecting apparatus to disconnect coiled tubing from downhole tools and the like by separation of shear screws, for example. Prior art downhole connection means 200 is arranged with coiled tubing 201 attached to locking sub 202. Upper screws 203 and 205, and lower screws 204 and 206 provide connection. Threaded connection 208 is screwed onto sleeve 209, and o-ring 210 provides sealing engagement on the coiled tubing. Mandrel 211 connects to threaded hub 212, and lower unit 215 is adjacent to upper body 213. Threaded connection 218 provides connection between downhole tool 219 and the lower body 215. A space 214 is within the string.

Shear screws 210 and 217 shear upon receiving a predetermined degree of force, thereby separating the downhole tool 219 from the coiled tubing. The range of this force sometimes is quite wide, and it is usually not possible to provide a narrow range of force at which such mechanical failure means will separate, releasing the coiled tubing.

The invention shown in. FIG. 26 is a composite disconnecting apparatus 231 which shows threaded sub 220 with internal space 222, and upper joinder threads 221 as part of upper threaded joinder 223. Upper threaded joinder 223 connects to the composite fiber pack 224 by a sealing engagement that is made to maximize the surface area of the composite threaded pack upon the upper threaded joinder to increase strength of the connection.

The fiber pack 224 is made so as to provide failure characteristics that are over a relatively narrow load range so that failure may be predetermined at a specific load. Fibers provide a more definite failure mechanism at specific loads than that afforded by metal shearing failure mechanisms. Composite fiber pack 226 is similarly connected to lower threaded joinder 228 which is threadedly or by other means connected by lower threaded joinder threads 229 to downhole tool 230.

FIG. 27 shows one embodiment of the invention of this application including a magnetic marking depth or other means of detecting a specific location on a CT string calculating configuration 235 which uses magnetic mark detector or other type of location detector, gamma ray, light, etc. detector 236 to assist in determining depth of coiled tubing. Wellbore 238 disposed below ground surface 237 contains casing 239 or can be open hole. Coiled tubing 240 is disposed within the casing and is passed along into the wellbore past the detector 236 which serves to record the length or location of tubing that has descended into the well by magnetic or other measurement means. Magnetic or other type of detectable nodes 241, 242, 243, 244, 245, and 240 each sequentially are recognized as they pass the detector 236.

In FIG. 28, a close up view of detection node 244 is shown wherein magnetically active fibers 247 are detectable by detector 236. Such fibers preferably are of the type INCO Vaporfab Nickel Coated Fibers, manufactured by INCO SPP at 681 Lawlins Road, Wyckoff, N.J. 07481. However, it is recognized that any number of fibers that are magnetically active, or radioactive or can give signal at a certain location in the coiled tubing could achieve the function of marking tubing depth. A. microprocessor also optionally may be provided within the layers of the coiled tubing, in the configuration of FIGS. 27 or 29.

An alternate configuration for determining coiled tubing depth is shown in FIG. 29. Subterranean depth calculating configuration 250 uses magnetic mark or other detectable nodes like radioaction indicator 251 (which may also be a relayer of information) to determine more accurately the depth of coiled tubing in a well. In this configuration, accuracy is improved because the "zero" point for depth calculation is advantageously located hundreds or thousands of feet below the ground surface, facilitating a much more accurate measurement of exact depth of coiled tubing, or perhaps a determination when the tool is exactly adjacent or above a particular subterranean structure that is intended to be modified by the downhole operation.

Magnetic or other detectable nodes 253, 254, 255, 250, 257, 258, and 259 operate to provide a detectable signal when they pass the mark indicator 251, which itself is incorporated into locking hub 260 downhole. This locking hub can be retrievable or permanently attached downhole. The mark indicator can also be part of the tubing, attaching to the outside. Further, a transmitter 252 may relay information uphole in real time manner by inductively sending pulses or other means, acoustic for transmission by conductors or fibers in the CCT wall. The transmitter downhole could also relay information via a conductor attached from the surface to the transmitter. Alternatively, an ultrasonic source could provide high energy pulses that change the property of a fiber optic conductor, which would be detectable at the surface and readable by a coiled tubing operator in real time during a job. Other conductive or detection methods and means are possible using specialized composite coiled tubing with magnetic mark or other indicators and conductive and/or other like acoustic means within the tubing. Further it would be possible to use a subterranean receptor attached different ways downhole and send data up the borehole through a conductor in the casing wall or tubing, rather than using a conductor or fiber in the coiled tubing.

Composite coiled tubing manufactured as set forth above offers several advantages over traditional tubing such as lower weight, better fatigue characteristics, low ovality, and data transmission by way of intrinsic conductors built into the tubing (no more cables in the inside diameter). Composite coiled tubing ("composite coiled tubing sometimes is abbreviated as "CCT"") has been studied to determine how CCT could be designed with better properties than steel coiled tubing ("coiled tubing sometimes is abbreviated herein as "CT").

The results reveal that composite coiled tubing is more advantageous than steel, especially in terms of its strength characteristics. The 'final' preliminary design outperformed steel CT in terms of pressure and axial strength, but at the sacrifice of flow area within the interior of the tubing.

The results of the study show that CCT is feasible based upon analytical models, limited environmental testing and production of short (10 foot) samples.

Various environmental conditions must be considered in the design of the composite laminate for coiled tubing. Specifically, exposure to both low and high temperatures (−50° F. and 400° F., respectively) in naturally occurring wellbore fluids is required, including for example selected acid solutions and organic solvents. Other important functional considerations include incorporation of a CCT field splicing technique and end-coupling designs as well as the incorporation of communications capability along the CCT length.

Composite laminate design and analysis was performed to create an optimum composite construction which satisfies all the load cases. The design was based on an optimizing routine and classical laminate plate theory. Since the 'plate' is relatively thick, finite element analysis was used to verify/improve the design, as further shown in the FIGS. 8–24. The various hostile environmental conditions currently experienced by the steel coiled tubing during service were considered. After completion o; the design and analysis of the composite structure, fabrication of reduced scale tubular sections was completed to support mechanical and environmental testing. In addition, fabrication of full scale, nominal 1.50" OD CT sections were completed to investigate: 1) incorporating a CCT coupling mechanism, 2) intrinsic communication lines and 3) the fatigue life of the proposed CCT design.

Advantages of composite coiled tubing include the ability to treat deeper wells, more buoyancy and improved buckling characteristics, better fatigue characteristics, little increase in ovality during the tubing lifetime, lower fluid friction and less pressure drop for a specified inner diameter. Intrinsic conductors (wire, fiber optics, etc.) in CCT wall are possibilities that provide distinct communication advantages.

Composite coiled tubing has several advantages over steel or alloy coiled tubing for oilfield service. The composite coiled tubing weighs considerably less which allows treatment of deeper wells and also is more buoyant which improves the buckling characteristics.

Steel tubing suffers from severe fatigue limits. Typically the tubing is scrapped because the fatigue limits have been reached. The steel is plastically deformed every time it is spooled off the reel, over the gooseneck, through the chains and the reverse process. It is known that the fatigue resistance of steel is severely degraded when it is plastically deformed. A main advantage of composite coiled tubing, other than the improved fatigue properties of composite materials compared to steel, is that typically it is not plastically deformed, thus its fatigue failure resistance remains high.

Steel coiled tubing also suffers from ovality and ballooning both of which are attributed to cyclic fatigue and result in severely degraded properties. For example, perfectly round 1.5", 0.095" thick steel coiled tubing has a collapse pressure of approximately 10,000 psi. Tubing with a 5% ovality ratio, typically the allowable maximum, has a collapse pressure of about 6,000 psi.

Composite tubing does not plastically deform, hence its ovality will be small. Steel coiled tubing exhibits a fluid resistance coefficient, friction, that approximates "smooth" tubing. As the tubing is used, this value increases which results in a larger pressure drop. The proposed CCT utilizes a plastic liner which should not change appreciably with use. Initially, the steel CT has a 10% to 20% higher pressure drop for a given flow diameter. The pressure drop of the steel CT will increase with time.

The final advantage of composite coiled tubing is related to the utilization within coiled tubing of an intercommunication or "Smart" coiled tubing. Conductors, fiber and/or microprocessors, may be intrinsically manufactured in the composite coiled tubing eliminating many of the problems associated with "Smart tubing" (i.e. cable in the inside diameter of CT). Another property of composite tubing, which could be advantageous or disadvantageous depending on the situation, is that the tubing would be virtually non-conductive. Disadvantages of coiled tubing include lower buckling load in 'dry' wells, more stored energy on the reel, higher initial cost, smaller inner diameter for a specified outer diameter, and larger diameter reels (8' minimum drum diameter for 1.5" CCT). Also, a microprocessor could be incorporated into the layers of the coiled tubing facilitating "smart" operations.

The only performance disadvantage currently known in use of composite coiled tubing as compared to steel is the lower bending stiffness of composite materials. One of the major operational characteristics of coiled tubing is the distance it can be run in the hole before the onset of helical buckling and thus lockup. Lockup is defined as the point at which the tubing cannot be pushed farther in the hole. Helical buckling is a function of the tubing modulus of elasticity and the moment of inertia.

Since the composite tubing has a lower modulus, but similar moment of inertia, earlier lockup will occur than steel tubing when running in a dry well. One unknown is the friction of composite coiled tubing. It is feasible to coat the tubing with a low friction coefficient material to improve the lockup properties. However, since the composite tubing is less dense than steel, the tubing will have less effective weight in fluid packed wells which decreases the frictional force and thus increases the distance to lockup.

Currently known CCT designs require a liner to prevent leakage through the wall of the CT. The liner serves no structural purpose, but uses valuable space (approximately 20% of the flow area). The liner also aids in manufacturing by providing a 'mandrel' on which to wind the composite material.

DESIGN OPTIMIZATION

Several fibers and matrix materials were considered based on temperature limits and chemical compatibility Genetic algorithm was used to determine 'ideal' laminate properties for various design cases (1000's of lamina combinations)

Six different load cases

Three matrix materials and four fiber materials were considered

Laminate design and analyses were performed using three distinct load cases, Table 1, which were based on the design criteria. Loads were converted into curvatures and/or stress resultants as required for a general laminated plate analysis. The computer program used was provided in conjunction with a combinatorial optimization routine.

This program searched for an optimum design given up to ten laminas (layers, plies, etc.). In a single run, thousands of material, stacking sequence and ply angle combinations were evaluated. Four fiber materials, E glass, S-2 glass, Kevlar 29, Kevlar 49, and three matrix materials, epoxy, polycyanate and siloxirane, were considered.

In each load set, the spool diameter was varied to study the trade-off between stresses due to spooling and the other loading conditions. A curvature term for the laminated plate analysis was calculated as follows:

$k=e/y$ where $e=y/r$ $y=$distance from neutral axis $r=$radius of curvature of neutral axis (1)

For a 1.5" diameter tube on a 6 foot diameter spool:

$e=0.75/36.75=0.0204$ (2)

$k=0.0204/0.75=0.0272$ (3)

For a 1.5" diameter tube on a 7 foot diameter spool:

$e=0.75/42.75=0.0175$ (4)

$k=0.0175/0.75=0.0234$ (5)

Based on the results of the optimization analysis, a hybrid construction with Kevlar 49 at approximately 85° and S-2 Glass at 0° with a matrix of either epoxy or Siloxirane was selected for prototype fabrication. This design, the lay-up for which is shown in FIG. 8 and tabulated in Table 2, met all three load case sets with a 7' diameter spool. Using a 6' diameter spool, the Kevlar just begins to reach compression failure under the more extreme loading conditions. The predicted longitudinal and transverse stiffness levels for the laminate are 3 msi and 9.6 msi, respectively. For comparison, the CCT samples made previously by US Composites Corporation ("US Composites") for Conoco Oil Company ("Conoco") had a longitudinal and transverse modulus of 1.09 msi. US Composites developed alternate designs, using axial carbon fiber, which have longitudinal moduli values of up to 9 msi, if required to control buckling. Temperature differences were not considered in the optimization analysis. When taken into account (to represent thermal residual stresses) in the optimized design, transverse failures, or micro-cracking, were indicated. Although these are not necessarily critical, they do suggest the need for an impermeable liner and/or layer. FIG. 8 shows composite coiled tubing laminate 110 containing finite elements 111 with a twelve layer finite element matrix (circumferential layers) containing depth lines 113. The ply or layers are numbered as seen in FIG. 10, counting the plies or layers from the outermost to the innermost layers, from outside to inside, and the innermost being layer 12. (See Table 2 below).

Full Scale CCT Test Section

Two full size cross section CCT samples, approximately 10' long, were fabricated. Fabrication of the 10' long sections

TABLE 1

Design Cases for Laminate Design

| | "Easy" | | | "Medium" | | | "Hard" | | |
| --- | --- | --- | --- | --- | --- | --- | --- | --- | --- |
| Load Case | Spooled | Axial (lbf) | Pressure (psi) | Spooled | Axial (lbf) | Pressure (psi) | Spooled | Axial (lbf) | Pressure (psi) |
| 1 | X | 0 | 0 | X | 0 | 0 | X | 0 | 0 |
| 2 | X | 0 | 7,500 | X | 0 | 11,250 | X | 0 | 14,000 |
| 3 | | — | 7,500 | | — | 11,250 | | — | 14,000 |
| | | 7,500 | | | 7,500 | | | 7,500 | |
| 4 | | 25,000 | 7,500 | | 27,500 | 11,250 | | 30,000 | 14,000 |
| 5 | | — | — | | — | — | | — | — |
| | | 7,500 | 5,750 | | 7,500 | 5,750 | | 7,500 | 5,750 |
| 6 | | 25,000 | — | | 27,500 | — | | 30,000 | — |
| | | | 5,750 | | | 5,750 | | | 5,750 | was completed using the standard epoxy matrix utilized on the first set of ¼" CCT samples discussed further herein. To facilitate fabrication of the limited length of full size CCT, commercially available stock materials were selected for the mandrel and liner materials. Specifically, standard 13/16" steel tubing was selected for the mandrel and a stock ⅞" ID×1.0" OD PVDF tubing was used as a liner. FIG. 6a shows the liner construction utilized on the these sections.

TABLE 2

Composite Coiled Tubing Laminate Design

| Ply Number | Ply Angle (Degrees) | Material | Thickness | Composite Layer (1–12) |
|---|---|---|---|---|
| 1 | 85 | Kevlar 49 | 0.015 | first (outer) |
| 2 | 0 | S-2 Glass | 0.015 | second |
| 3 | −85 | Kevlar 49 | 0.015 | third |
| 4 | 0 | S-2 Glass | 0.015 | fourth |
| 5 | 85 | Kevlar 49 | 0.015 | fifth |
| 6 | −85 | Kevlar 49 | 0.015 | sixth |
| 7 | −85 | Kevlar 49 | 0.015 | seventh |
| 8 | 85 | Kevlar 49 | 0.015 | eighth |
| 9 | 0 | S-2 Glass | 0.015 | ninth |
| 10 | −85 | Kevlar 49 | 0.015 | tenth |
| 11 | 0 | S-2 Glass | 0.015 | eleventh |
| 12 | 85 | Kevlar 49 | 0.015 | twelfth (inner) |

Using a scale up of the ¼" CCT sample construction, and additional dry fiber wrapping trials over the fall size mandrel, the following construction was utilized in fabrication of the full size CCT sections.

Two 10' CCT sections were fabricated, (see FIG. 6a), using the above fiber construction and on-line resin impregnation with the epoxy system. To demonstrate the ability to include communications capability in the CCT, four individual 28 gauge insulated copper wires were installed in the laminate concurrent with the application of the first ply. These conductors were installed longitudinally in the full scale samples for demonstration purposes only and alternate incorporation techniques are being considered for the production CCT.

As discussed above, the resulting outside diameter, using the predicted 12 ply design construction and the undersized stock liner, was expected to fall short of the 1.5" nominal outside diameter. Therefore, to provide a configuration more representative of the desired 1.5" nominal OD, a sample of CCT section was fabricated using a 14 ply construction of alternating unidirectional fiberglass and high angle Kevlar. The average outside diameter of this cured sample was determined to be 1.395" which approaches the predicted 1.410" outsider diameter per the computer generated laminate design over the 1.050" ideal liner. The second 10' section, Sample #2 was fabricated using a 12 ply construction of the same alternating fiber plies and had a resulting average outside diameter of 1.340". Accordingly, a Sample section is more representative of the actual 12 ply design laminate construction tabulated earlier in this report.

TABLE 3

Composite Coiled Tubing Laminate Design

| Ply Number | Ply Angle (Degrees) | Material | Thickness |
|---|---|---|---|
| 1 | 0 | S-2 Glass | 0.012 |
| 1 | 0 | S-2 Glass | 0.012 |

TABLE 3-continued

Composite Coiled Tubing Laminate Design

| Ply Number | Ply Angle (Degrees) | Material | Thickness |
|---|---|---|---|
| 2 | −81 | Kevlar 49 | 0.016 |
| 3 | 0 | S-2 Glass | 0.012 |
| 4 | 81 | Kevlar 49 | 0.016 |
| 5 | 0 | S-2 Glass | 0.012 |
| 6 | −81 | Kevlar 49 | 0.016 |
| 7 | 0 | S-2 Glass | 0.012 |
| 8 | 81 | Kevlar 49 | 0.016 |
| 9 | 0 | S-2 Glass | 0.012 |
| 10 | −81 | Kevlar 49 | 0.016 |
| 11 | 0 | S-2 Glass | 0.012 |
| 12 | 81 | Kevlar 49 | 0.016 |
| 13[1] | 0 | S-2 Glass | 0.012 |
| 14[1] | −81 | Kevlar 49 | 0.016 |

[1]Plies 13 and 14 apply to Sample #1 only.

S-2 Glass is believed to be a registered trademark of Owens-Corning and this material may be obtained from Owens Corning. Kevlar 49 is believed to be a registered trademark of Dupont Company, and this material may be obtained from Dupont.

It is also noted that an 'on-line' resin curing system is planned for the production CCT cell. This curing method, however, could not be practically incorporated in the prototype manufacturing cell utilized in fabrication of the 10' CCT sections. Alternatively, the 10' sample sections were overwrapped with conventional heat shrink materials and then rotisserie cured in a conventional oven. The heat shrink materials were utilized to provide both laminate consolidation and an acceptable exterior surface appearance. During design and fabrication phases, it was considered that interim staging of the various CCT plies may become necessary to ensure adequate cure and to maintain dimensional stability of the relatively thick wall section.

Sample #1 CCT section was fabricated by applying several layers of wet wrapped fiber, staging of the partial build-up, application of the remaining plies, and, subsequent shrink wrap and curing of the laminate. For comparative purposes, Samples #2 was fabricated by applying all wet wrapped plies to the mandrel, an overwrap of heat shrink tape, and final cure of the laminate. As expected, irregularities of the sample section surface finish resulted from the relatively thick, compliant laminate being over consolidated in localized regions by the heat shrink wrap during cure. As a result, it is anticipated that on-line staging of the production CCT, at select layers in the multiply wall thickness will be required.

BUCKLING OF COMPOSITE COILED TUBING (CCT)

CCT Modulus=3 msi ('best' overall design)
IF CCT friction=CT friction then CCT lockups at 60% of CT lockup length
If CCT friction=½ CT friction then CCT lockups at 120% of CT lockup length
CCT Modulus=9 msi (stiffest design for buckling resistance)
If CCT friction=CT friction then CCT lockups at 100% of CT lockup length
If CCT friction=½ CT friction then CCT lockups at 200% of CT lockup length
Buckling is one of the controlling parameters in coiled tubing operations. The CT buckles downhole as shown in FIG. 4. A cursory buckling analysis was performed based on industry recognized technology. The controlling parameters for a buckling problem (sinusoidal buckling, FIGS. 5a and 5b) are the section modulus (linear relation), weight (linear relation) and length (nonlinear relation). However, for helical buckling, FIGS. 5c and 5d, only the section modulus and weight are of consequence.

The section modulus of the proposed composite coiled tubing is approximately 1/10 that of steel coiled tubing, and the weight of the tubing per foot is approximately ½. Both of these parameters are comparable to other companies' CCT designs. The lower section modulus reduces the buckling length but is somewhat offset by the lower CCT weight. The effective weight is dependent on the fluid in the well (buoyancy of the CT string).

A simple governing equation for helical buckling [1] is $$F^* = 2.85(EI)^{0.504} w^{0.496} \left(\frac{\sin\alpha}{r}\right)^{0.511} \quad (6)$$

where
E=Modules of Elasticity
r=Moment of Inertia
w=CT buoyed weight
a=well deviation from vertical
r=radius of outer tubing/casing Lockup occurs when the friction force required to push the pipe downhole is equivalent to the helical buckling load, thus the tubing can no longer be pushed down hole. The friction force can be calculated using [2]

$$q = \frac{F_l^2 r}{4EI} + w\sin\alpha\cos\beta \quad (7)$$

where
$F_1$=loading force
b=angle from bottom of outer tubing/casing The first term is the normal force exerted by the helical buckling, and the second term is the coiled tubing weight. Therefore, the total frictional force can be written as $$F_f = fL\left(\frac{F_l^2 r}{4EI} + w\sin\alpha\right) \quad (8)$$

where
f=friction coefficient
L=depth of CT

The depth the CT can be pushed before lockup can thus be approximated as $$L = \frac{F^*}{f\left(\frac{F^{*2}r}{4EI} + w\sin\alpha\right)} \quad (9)$$

The results shown in Table 4 are for a horizontal section only. A casing radius of 4" is assumed. Two different composite moduli are used. The first is the proposed design and the second is the maximum value determined by the design procedure. Also, two different friction coefficients are assumed. The first case uses the same friction as steel CT and the latter assumes ½ the friction coefficient. Actual values will have to be determined, but handbooks show plastic laminate/steel friction coefficients as low as ½ steel/ steel values. Column 4 of Table 4 shows the ratio of the lockup distance of CCT to steel CT. Obviously, the results can be construed to match any viewpoint. The worst case is that CCT will only be pushed half as far as steel CT in horizontal applications and the best scenario is that CCT can be pushed twice as far. Realistically, CCT will exhibit similar lockup distances as steel CT.

TABLE 4

Comparison of Lockup Depth for CCT Versus CT

| Composite Axial Modulus (msi) | Wellbore Fluid | Friction Coefficient, $f_c/f_{st}$ | Lockup Ratio, $L_c/L_{st}$ |
|---|---|---|---|
| $3 \times 10^6$ | dry | 1.0 | 0.57 |
| $3 \times 10^6$ | water | 1.0 | 0.63 |
| $3 \times 10^6$ | dry | 0.5 | 1.16 |
| $3 \times 10^6$ | water | 0.5 | 1.25 |
| $9 \times 10^6$ | dry | 1.0 | 1.00 |
| $9 \times 10^6$ | water | 1.0 | 1.08 |
| $9 \times 10^6$ | dry | 0.5 | 2.00 |
| $9 \times 10^6$ | water | 0.5 | 2.16 |

FINITE ELEMENT ANALYSIS 21 different lead cases were analyzed
Y Axial load
  Spooled tubing
  Load due to tubing weight
Internal pressure
External pressure
The six most severe cases were studied in detail
Results verify design procedure
Limited modifications are required to meet "hard" specification except for 300° F. temperature limit The finite element analysis was conducted using ANSYS, which is a computer program written by Swanson Analysis System Incorporated of P.O Box 65 Johnson Road, Houston, Pa. 15342. Normally, pressurized tubes are modeled using axisymmetric shell or solid elements, depending on the thickness. However, since the problem contains non-axisymmetric loading (bending), these types cannot be used. The next logical choice would be plane stress or plane strain elements. Again, most planar elements, including ANSYS's elements, do not allow this type of loading due to the bending loads, as well as the axial loads. Therefore, three dimensional solid elements must be used.

The coiled tubing is constructed of three-dimensional solid elements with one element along the length and numerous elements radially and circumferentially. A typical model is shown in FIG. 9, the length is greatly exaggerated for a clearer picture. Only one element through the thickness is required since the strain field is constant. The length of the 'slice' should be approximately equal to the element length in the radial and hoop directions for well shaped elements. A special layered composite element was used; however, the elements are not easy to use (the orientation of the elements was tedious to construct).

In FIG. 9, a composite coiled tubing finite element model 115 with depth lines 116 and a twelve layer matrix 117 is shown. The elements were formulated to allow several laminas per element, but one element per lamina was used for improved results, as seen in FIGS. 10–24. Better results could be obtained by using more than one element per lamina, the need of which will be demonstrated later. For this preliminary analysis, however, one element per layer suffices. The basic element is an eight node (linear) formulation but allows higher order (parabolic) displacement shapes. There are 12 laminas. The other laminas are +/−85 degrees from the axial (stiff in the circumferential direction).

As discussed previously, only one element is along the length, which is constant strain. Symmetry is not used for two reasons. The first is that ¼ symmetry cannot be used because of the bending loads (½ would have to be used). The second is that since the circumferential laminas are not symmetric, the ½ model symmetry is destroyed.

Pressure loads are applied by either pressure applied to the internal surface or external surface. Axial loads are applied by displacing the axial direction a prescribed amount thus providing the applied axial load. The difficulty in defining the loading parameters arises from the debate of plane strain versus plane stress. If the coiled tubing is allowed to move freely in the well (assuming negligible friction) then plane stress occurs; however, if the coiled tubing is fixed at the end (by a tool) and tension is applied, then plane strain occurs. In most cases the plane stain condition is most severe, so that is what is modeled. One end of the tubing is completely constrained while the other end is given a displacement based on the stress level. The problem with this technique is that as external pressure is applied to the tubing, the tubing elongates due to Poisson's ratio thus reducing the effective axial load.

Failure criteria for this analysis are believed to be at levels of about the following:

| Axially stiff lamina | |
|---|---|
| longitudinal stress - tension: | 360 ksi |
| longitudinal stress - compression: | 124 ksi |
| transverse stress - tension: | 11 ksi |
| transverse stress - compression | 24 ksi |
| Hoop stiff lamina | |
| longitudinal stress - tension: | 315 ksi |
| longitudinal stress - compression: | 45 ksi |
| transverse stress - tension: | 12 ksi |
| transverse stress - compression | 27 ksi |

FIG. 10 shows axial stress model 140 with coiled tubing which is spooled and deformed on an 84 inch reel. The layers of this model, and for explanatory purposes, layers generally in this modeling, are numbered, for example here, as first finite element layer 141, second finite element layer 142, third finite element layer 143, fourth finite element layer 144, fifth finite element layer 145, sixth finite element layer 146, seventh finite element layer 147, eighth finite element layer 148, ninth finite element layer 149, tenth finite element layer 150, eleventh finite element layer 151, and twelfth finite element layer 152.

FIG. 10 shows particularly high tension levels in high tension zone 155, while showing high compression levels in high compression zones 153 and 154.

In the axially stiff laminas (layers 2,4,9,11) the axial stress corresponds to the longitudinal strength ad the hoop and radial stresses to the transverse stress. For the hoop stiff laminas (1,3,5,6,7,8,10,12) the fibers are oriented at 85 degrees to the axial. Therefore, the radial stress closely corresponds to the longitudinal strength, but the strength at 90 degrees will be lower. The hoop and axial stresses closely correspond to the transverse stress, but the strength will be slightly higher at 0 degrees. The failure properties for the laminas can be specified in ANSYS using either a default failure criteria or a user defined criteria. For this preliminary analysis, neither was used.

Twenty-one different load cases were evaluated for the finite element analysis. The axial loading varied from spooled tubing to tubing in both tension and compression. Internal pressure was varied from 0 psi to 22,500 psi. External (hydrostatic) pressure was varied from 0 psi to 15,000 psi. Safety factors of 2 and 1.5 were used for surface and downhole conditions respectively. The six most severe cases are documented below.

EXAMPLE 1

Load Case A.1: CCT spooled on an 84" drum without pressure. Increasing the pressure reduces the minimum stress and increases the maximum stress which is a less severe case. This case will fail in axial compression. Axial stress is plotted in FIG. 10. Note the low stress in the hoop (circumferential) laminas and the overall bending behavior of the section.

Load Case A.2: CCT spooled on a 94" drum without pressure. Axial stresses are plotted in FIG. 11, which shows axial stress model 158 as existing on a spooled reel. High tension finite element 156 and high compression finite element 157 are visible. In this case axial stresses are close to failure (compression), but manageable through material modifications and/or design modifications.

EXAMPLE 2

Load Case B: CCT downhole with 15000 psi internal pressure and 30000 lb.. axial load.

Axial stress, FIG. 12, in a downhole (unspooled) condition with only internal pressure (safety factor of 1.5 on 10,000 psi) along with 30,000 lb. axial load (low safety factor on axial load is generally used). Axial stress model 161 reveals second finite element layer 163 and ninth finite element layer 164 that show axial stresses (pulling) due primarily to gravity since the tubing is in the unspooled state.

FIG. 13 shows the hoop stress for load case B, including hoop stress model 165 (showing internal pressure effects) and twelfth finite element layer 166, which shows high pressure.

Note the very low stress states—approximately ½ of failure in the hoop laminas and ⅓ in the axial laminas. The hoop (circumferential) stress is shown in FIG. 18. The stress in the hoop-stiff laminas are low compared to failure; however, the stress in the axial-stiff laminas are at failure (low strength transverse to fiber orientation). FIG. 14 shows the radial stress, the pressure gradient through the element. Radial stress model 168 discloses first finite element layer 169 and second finite element layer 170 and twelfth finite element layer 171. The minimum stress should be 15,000 psi and the maximum stress 0 psi. The actual is 13655 and 133 psi which is an error in mesh refinement. Better refinement will provide better results at the expense of time. For a final design, the analysis would be better refined. The compressive transverse strength of the laminas is twice the tensile, hence this stress is well below failure (approximately ½).

EXAMPLE 3

Load Case C: CCT downhole with 7500 psi external pressure and −7500 lb.. axial load Axial stress are plotted in FIG. 15 for tubing in a downhole condition with external pressure and −7500 lb.. axial load. Axial stress model 173, as expected shows that the axial stresses are very low. Hoop stress are shown in FIG. 16, in hoop stress model diagram 175. Stresses as shown in FIG. 16 are well within maximum and minimum stresses should be 0 and −7500 but are actually −541 and −7374 respectively for the reasons discussed above.

EXAMPLE 4

Load Case D: CCT downhole wits 20,000 psi internal pressure Hoop stress for downhole condition with 0 axial load and 20,000 psi internal pressure is plotted in FIG. 18. FIG. 18 contains hoop stress diagram 178, and one may note the stress levels in twelfth finite element layer 179. This loading condition would occur between the gooseneck and reel in high pressure situations, 10000 psi with a safety factor of 2 (surface). The axial stiff laminas would crack in this case, but the hoop stiff laminas are well below (⅓) their failure strength.

FIG. 19 shows the radial stress. Radial stress diagram 180 in FIG. 19 further reveal eleventh finite element layer 181 and twelfth finite element layer 182. Note that stresses are not very close to the pressure at the OD and ID. All stresses are well below the failure stress.

EXAMPLE 5

Load Case E: CCT downhole with 22,500 psi internal pressure, 15,000 external pressure and 30,000 lb.. axial load Axial stress are plotted in FIG. 20 for the most severe downhole case with maximum internal pressure, wellbore pressure and axial load. FIG. 20 reveals axial stress condition 184 with areas of relatively high stress shown at fifth finite element layer 185, sixth finite element layer 186, seventh finite element layer 187 and eighth finite element layer 188. Axial stresses are well within limits, again approximately ½ or less of failure. FIG. 21 shows the hoop stress. As in FIG. 18, the axial stiff laminas would crack, but both the hoop stiff laminas are approximately ¼ of their failure stress. Radial stresses are plotted in FIG. 22, as shown by radial stress condition 192. First finite element layer 193 and twelfth finite element layer 194 show that pressures are suite low on the outer layer but relatively higher on the inner layer. Extreme stresses match applied pressure fairly well.

EXAMPLE 6

Load Case F: CCT downhole with 22,500 psi internal pressure, 15,000 external pressure Similar loading as the previous case but without the axial load. The hoop stress, FIG. 23, is slightly lower, but not much indicating that axial load does not significantly affect this particular CCT design when considering stresses in the hoop direction. Hoop stress condition 196 is shown in FIG. 23. Radial stresses are shown in FIG. 24 (showing radial stress condition 198) which are not much different than FIG. 22.

The finite element analysis load cases were more severe than those used in the computer program. The design load cases are realistic service conditions while the FEA are the most rigorous including 10,000 psi tubing pressure and 7,500 psi hydrostatic pressure with high safety factors. In general the finite element results verify the results from the software program. The CCT design meets the minimum requirements and with some modifications will likely meet the maximum requirements.

THE FOLLOWING LITERATURE REFERENCES ARE INCORPORATED BY REFERENCE

1. Dawson, R., and Paslay, P. R., 'Drill Pipe Buckling in Inclined Holes', *Journal of Petroleum Technology,* pp. 1734–1738, 1984

2. Chen, Y. C., and Cheatham, J. B., 'Wall Contact Forces on Helically Buckled Tubulars in Inclined Wells', *Transactions of the ASME,* pp. 142–144, Vol. 112, 1990.

The invention has been described in the more limited aspects of preferred embodiments hereof, including numerous examples. Other embodiments have been suggested and still others may occur to those skilled in the art upon a reading and understanding of the this specification. It is intended that all such embodiments be included within the scope of this invention.

What is claimed is:

1. A composite coiled tubing that resists buckling within the wellbore comprising a substantially cylindrical hollow tube having a reel end proximate a coiled tubing reel and a distal end adapted for insertion into a wellbore, comprising:

a surface layer;

a cylindrical composite fiber layer, wherein the composite fiber layer is concentrically inside of the surface layer, the composite fiber layer formed by weaving composite fiber in a predetermined pattern whereby the fibers may be oriented in angular relationship to the longitudinal direction of the coiled tubing such as to provide appropriate strength and buckling characteristics to the coiled tubing, the fibers being oriented such that the modulus strength of the composite coiled tubing is dependent upon the orientation of the woven fibers, wherein the angle formed by the fiber as compared to the longitudinal direction of the coiled tubing is variable along the length of the coiled tubing;

a cylindrical liner layer concentrically inside the composite fiber layer, said cylindrical liner layer being capable of providing chemical resistance to abrasive fluids, wherein conductive fibers are provided within the composite coiled tubing, the fibers being adapted to transmit signals representing data, the fibers being adapted to receive data along their length at specific location(s) along the composite coiled tubing;

a composite disconnect on the distal end of the composite coiled tubing, said disconnect having a plurality of fibers of varying strength and orientations mixed into a fiber blend, wherein the load range at which the composite disconnect fails corresponds to the failure characteristics of the fiber blend, the fiber blend having a predetermined failure limit and providing an indication of failure upon loss of signals in said fibers;

at least one magnetic node recognizable by a detector, wherein passage of the magnetic node near said detector may be used as a data point to determine depth of the composite tubing within the wellbore;

the composite coiled tubing adapted to resist buckling within the wellbore.

2. A method of disconnecting a tool string from coiled tubing to facilitate retrieval of the coiled tubing, comprising the steps of:

(a) providing a composite disconnect, the disconnect removably interconnecting coiled tubing to a tool string, the composite disconnect adapted for failure at a predetermined load range;

(b) inserting coiled tubing into a wellbore, the coiled tubing having a reel end and a distal end, the distal end having attached a tool string secured by a composite disconnect;

(c) disconnecting at a predetermined location proximate the distal end of the coiled tubing from the tool string at a predetermined load range, thereby facilitating retrieval of the coiled tubing from the wellbore.

3. The method of claim 2 comprising the additional step of:

providing a composite disconnect comprising a plurality of fibers of varying strength mixed into a fiber blend, wherein the load range at which the composite disconnect fails corresponds to the failure characteristics of the fiber blend.

4. The method of claim 3 wherein the fiber blend comprises fibers of different orientations.

5. The method of claim 2 comprising the additional step of:

contacting the composite disconnect with acid, thereby degrading the composite disconnect, facilitating release of the tool string from the distal end of the coiled tubing.

6. The method of claim 5 wherein the acid is pumped through the coiled tubing to the distal end of the tubing, thereby facilitating release of the tool string.

7. An apparatus for reversibly attaching a tool string to coiled tubing, comprising:

a composite disconnect having a plurality of fibers of varying strength mixed into a fiber blend, wherein the load range at which the composite disconnect fails corresponds to the failure characteristics of the fiber blend, the fiber blend having a predetermined failure limit;

means for reaching the failure limit of the fiber blend.

8. An apparatus as set forth in claim 7 wherein said fiber blend comprises different orientations.

9. An apparatus as set forth in claim 7 wherein said composite disconnect includes a threaded upper connecting member adjacent one end of said apparatus and a threaded lower connecting member adjacent an opposed end of said apparatus, and said plurality of fibers comprises a fiber pack connected between said upper and lower connecting members.

10. An apparatus as set forth in claim 7 wherein a separate upper sub is connected to said upper connecting member.

11. An apparatus as set forth in claim 9 wherein said fiber pack is of a generally cylindrical shape and formed of a plurality of fibers having failure characteristics over a relatively narrow load range so that failure may be predetermined at a specific load.

12. An apparatus as set forth in claim 9 wherein said upper connecting member is arranged and constructed for connection to said coiled tubing and said lower connecting member is arranged and constructed for connection to said tool string.

13. A composite coiled tubing having a reel end proximate a coiled tubing reel and a distal end adapted for insertion into a wellbore, said coiled tubing comprising:

a surface layer;

a cylindrical composite fiber layer concentrically inside of the surface layer;

a cylindrical liner layer concentrically inside the composite fiber layer capable of providing chemical resistance to abrasive fluids;

conductive fibers within the composite coiled tubing adapted to transmit signals representing data, said conductive fibers being adapted to receive data along their length at specific locations along the composite coiled tubing; and a composite disconnect adjacent the distal end of the composite coiled tubing for connecting the coiled tubing to a tool string, said disconnect having a plurality of fibers of varying strength and orientations mixed into a fiber blend, wherein the load range at which the composite disconnect fails corresponds to the failure characteristics of the fiber blend, the fiber blend having a predetermined failure limit.

14. A composite coiled tubing as set forth in claim 13 herein said composite disconnect includes a threaded upper connecting member adjacent on e end of said disconnect and a threaded lower connecting member adjacent an opposed end of said disconnect, and said plurality of fibers comprises a fiber pack connected between said upper and lower connecting members.

15. A composite coiled tubing as set forth in claim 14 wherein a separate sub is secured to said upper connecting member.

16. A composite coiled tubing as set forth in claim 14 wherein said fiber pack is of a generally cylindrical shape and formed of a plurality of fibers having failure characteristics over a relatively narrow load range so that failure may be predetermined at a specific load.

17. A composite coiled tubing as set forth in claim 15 wherein said upper connecting member is arranged and constructed for connection to said coiled tubing and said lower connecting member is arranged and constructed for connection to said tool string.

18. A composite coiled tubing having a reel end proximate a coiled tubing reel and a distal end connected to a tool string and adapted for insertion into a wellbore, said coiled tubing comprising:

a surface layer;

a cylindrical composite fiber layer concentrically inside of the surface layer;

a cylindrical liner layer concentrically inside the composite fiber layer along their length at specific locations along the composite coiled tubing; and a composite disconnect adjacent the distal end of the composite coiled tubing for connecting the coiled tubing to a tool string, said disconnect having a plurality of fibers of varying strength and orientations mixed into a fiber blend, wherein the load range at which the composite disconnect fails corresponds to the failure characteristics of the fiber blend, the fiber blend having a predetermined failure limit.

19. A composite coiled tubing as set forth in claim 18 wherein said composite disconnect includes a threaded upper connecting member adjacent one end of said disconnect and a threaded lower connecting member adjacent an opposed end of said disconnect, and said plurality of fibers comprises a fiber pack connected between said upper and lower connecting members.

20. A composite coiled tubing as set forth in claim 19 wherein a separate sub is connected to said upper connecting member.

21. A composite coiled tubing as set forth in claim 19 wherein said fiber pack is of a generally cylindrical shape and formed of a plurality of fibers having failure characteristics over a relatively narrow load range so that failure may be predetermined at a specific load.

22. A composite coiled tubing as set forth in claim 19 wherein said upper connecting member is arranged and constructed for connection to said coiled tubing and said lower connecting member is arranged and constructed for connection to said tool string.

\* \* \* \* \*